(12) United States Patent
Soenmez et al.

(10) Patent No.: US 8,393,165 B2
(45) Date of Patent: Mar. 12, 2013

(54) SERVICE METHOD AND SERVICE DEVICE FOR A LIQUID COOLING SYSTEM OF AN AIRCRAFT

(75) Inventors: Kenan Soenmez, Hamburg (DE); Axel Redemann, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 791 days.

(21) Appl. No.: 12/616,405

(22) Filed: Nov. 11, 2009

(65) Prior Publication Data
US 2010/0126189 A1    May 27, 2010

Related U.S. Application Data

(60) Provisional application No. 61/113,782, filed on Nov. 12, 2008.

(30) Foreign Application Priority Data

Nov. 12, 2008   (DE) .................... 10 2008 056 920

(51) Int. Cl.
F25B 45/00    (2006.01)

(52) U.S. Cl. .............................................. 62/77; 62/298

(58) Field of Classification Search ............... 62/77, 194, 62/200, 239, 292, 298
See application file for complete search history.

(56) References Cited

U.S. PATENT DOCUMENTS

| | | | |
|---|---|---|---|
| 5,533,345 A * | 7/1996 | Roth | ................. 62/77 |
| 6,205,803 B1 | 3/2001 | Scaringe | |
| 7,356,381 B2 * | 4/2008 | Crisp, III | ..................... 700/242 |

FOREIGN PATENT DOCUMENTS

| | | |
|---|---|---|
| DE | 10 2006 041 788 | 3/2008 |
| WO | WO2009/058677 | 5/2009 |

* cited by examiner

*Primary Examiner* — Melvin Jones
(74) *Attorney, Agent, or Firm* — Wood, Herron & Evans, LLP

(57) ABSTRACT

The present invention discloses a service method and a service device (50) for a liquid cooling system (1) of an aircraft, the service device (50) being adapted to send at least one instruction to a liquid cooling control device (10) of the liquid cooling system (1). A plurality of service lines (52, 54, 56, 58, 62) are then connected between the service device (50) and the to liquid cooling system (1). The entire liquid cooling system (1) or a sub-system (12) can then be filled, emptied, deaerated and checked in respect of a leakage. Further, it is possible to set the fill level of a reservoir (8) and to service a fill-level sensor (99) of the reservoir (8).

14 Claims, 11 Drawing Sheets

Figure 1:
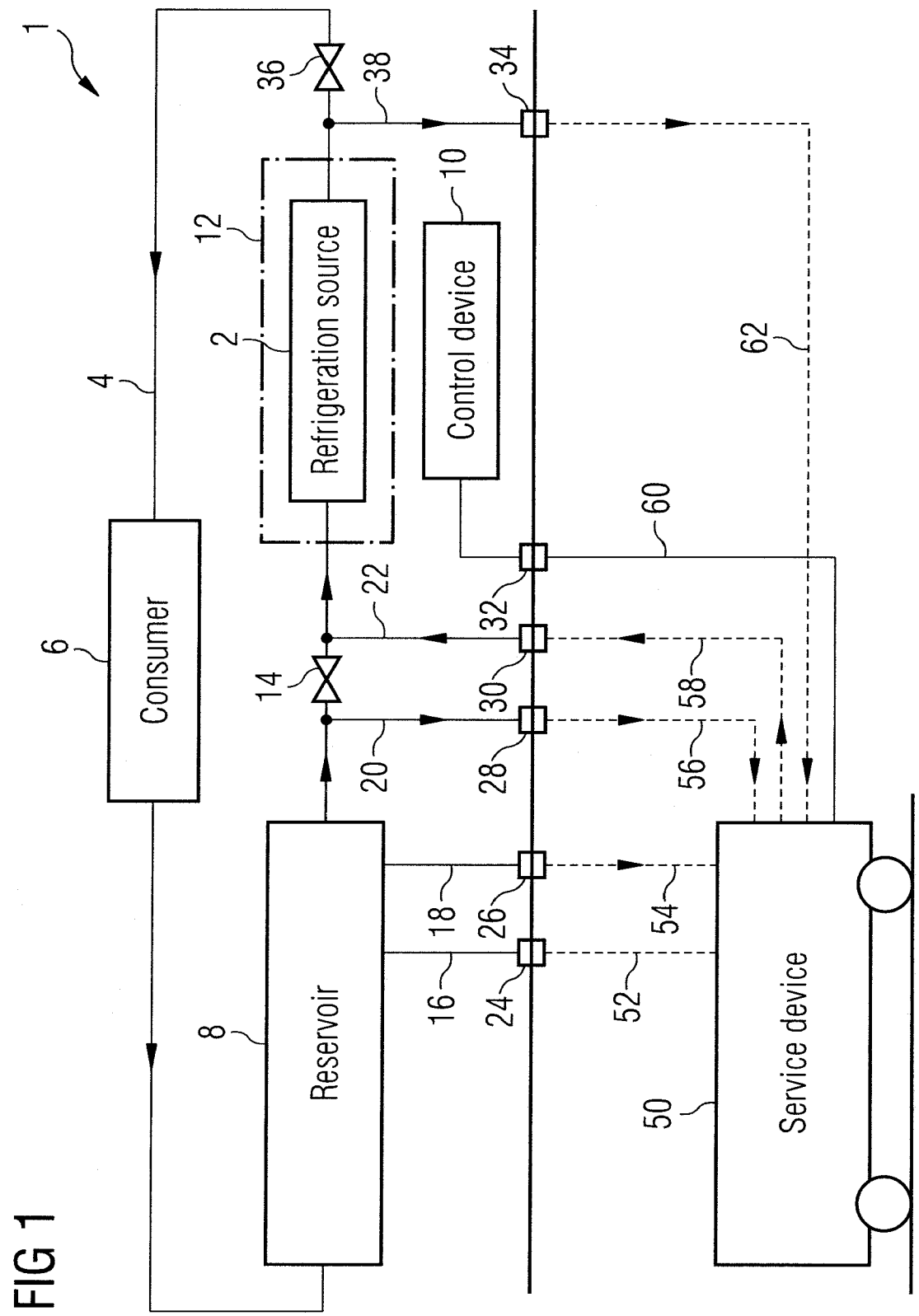

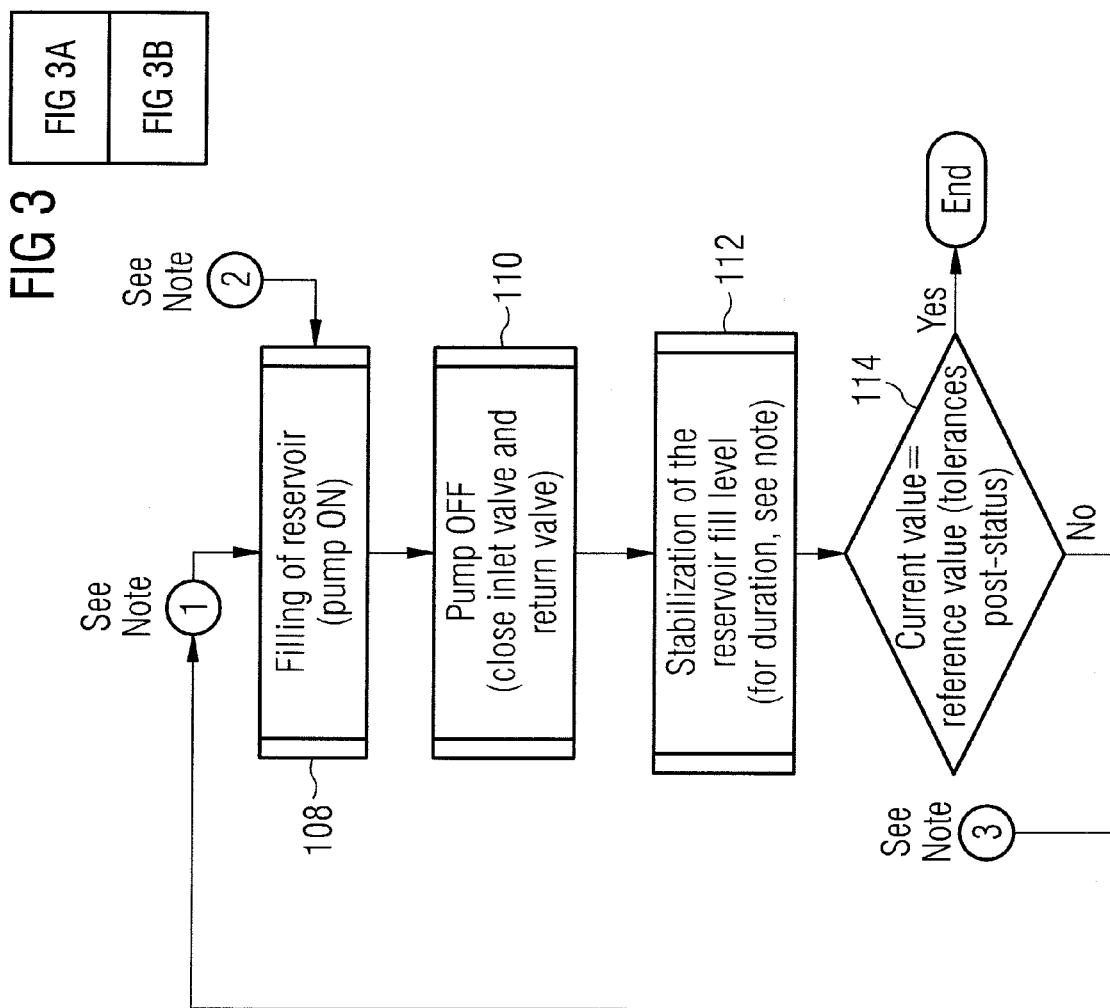
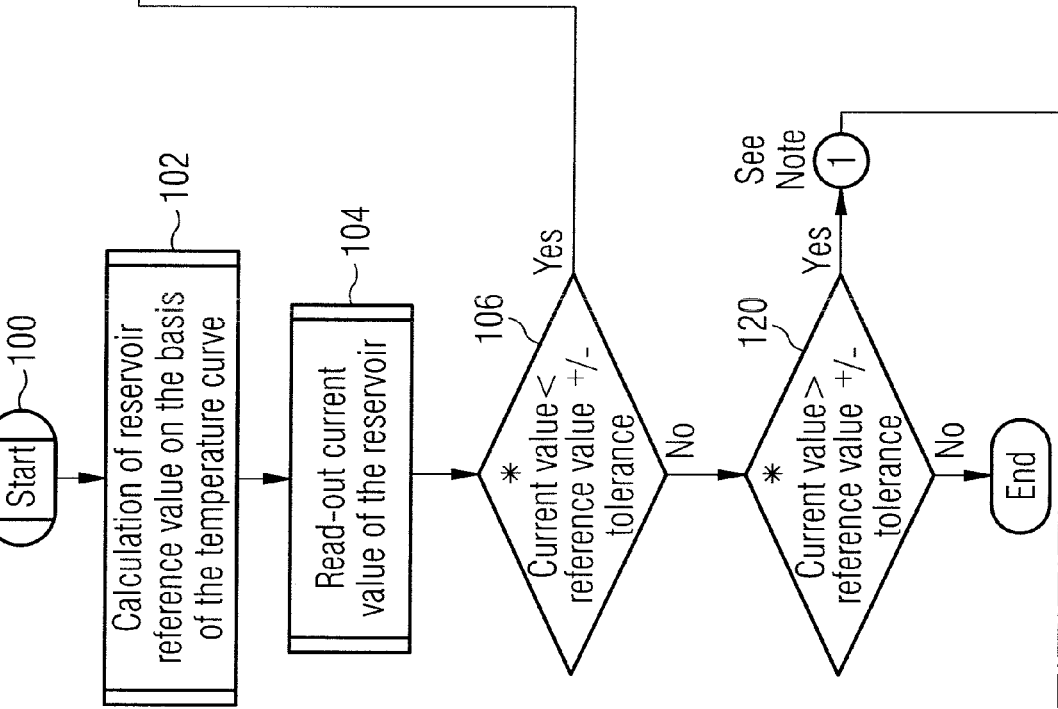

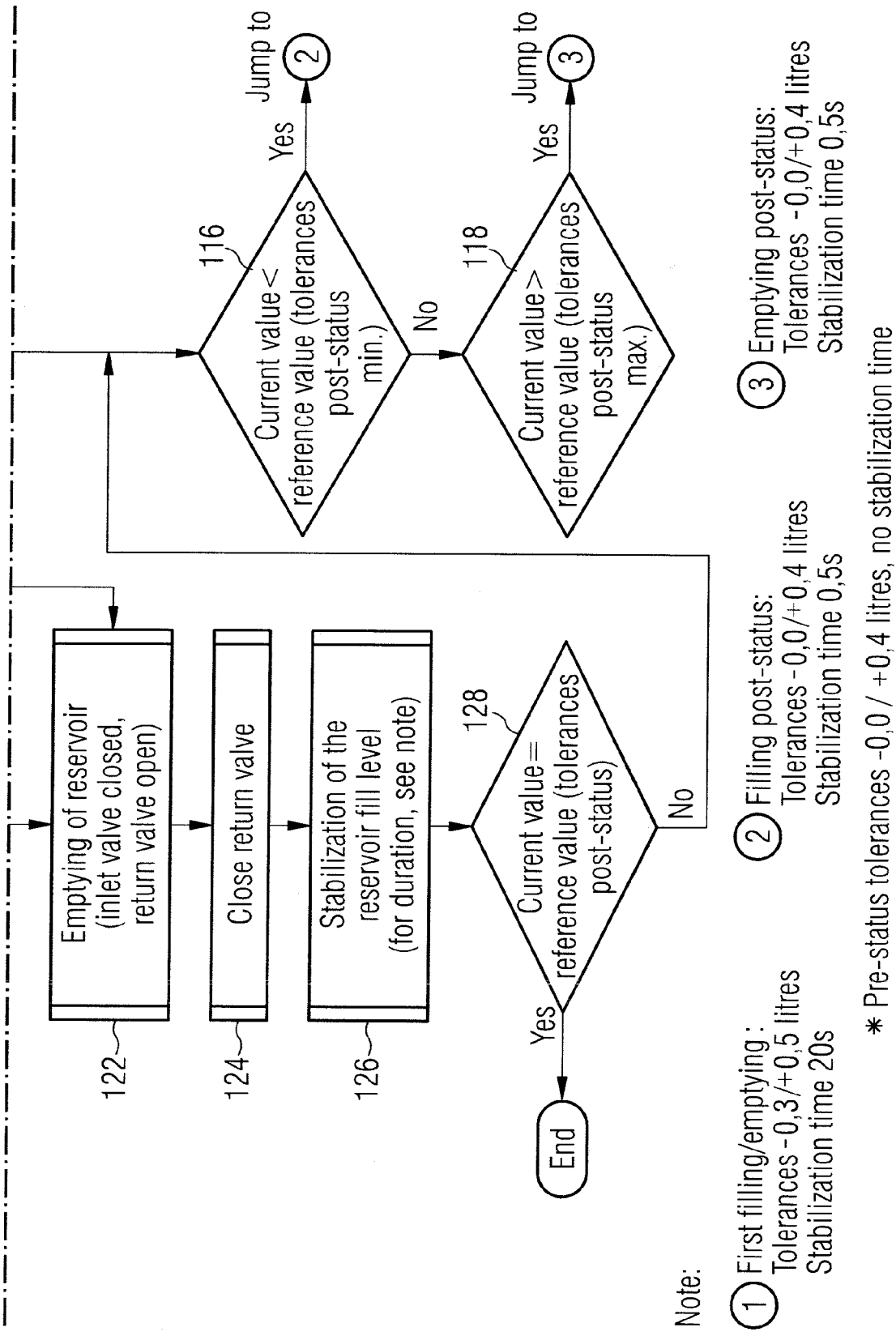

SERVICE METHOD AND SERVICE DEVICE FOR A LIQUID COOLING SYSTEM OF AN AIRCRAFT

This application claims priority to U.S. Provisional Patent Application No. 61/113,782 filed on Nov. 12, 2008; and/or German Patent Application No. 102008056920.8, filed on Nov. 12, 2008.

The present invention relates to a system for servicing a liquid cooling system of an aircraft or a component of the liquid cooling system, to a low-service aircraft liquid cooling system, and to a service device for such a liquid cooling system.

Increasingly, liquid cooling systems are used in aircraft. Liquid cooling systems typically comprise a refrigeration source, which delivers liquid coolant into a closed cooling circuit. In the closed cooling circuit there are one or more refrigeration consumers. The refrigeration consumers can be arranged in succession or in parallel. The refrigeration consumers can be, for example, refrigerators in the galleys, for example for the purpose of refrigerating food; electronic devices, for example flight control computers in the so-termed avionics bay; or entertainment systems; and regions requiring individual climate control, for example a suite or seat in the first-class region. After the coolant has passed through the refrigeration consumers, it is carried back to the refrigeration source, through the closed cooling circuit. The refrigeration source can be a compression refrigerating machine, which is arranged outside of a pressurized fuselage, beneath the wing centre box. In this case, the waste heat from the compression refrigerating machine is delivered directly to the outside air.

Liquid cooling systems have the advantage that the liquid coolant can be carried from the refrigeration source to the refrigeration consumers by means of lines having a relatively small cross-section. Consequently, these lines can be arranged in a relatively flexible and space-saving manner in the fuselage of the aircraft. Further, owing to the relatively high thermal capacity of a liquid coolant, greater distances can be realized between the refrigeration source and the refrigeration consumer. This has the advantage that fewer refrigeration sources are required in the aircraft, as a result of which the weight of the aircraft is reduced and the reliability of the aircraft is increased.

A mixture of water and glycol can be used as a coolant. It is also possible to use perfluor polyethers, which are distributed, for example, under the brand name Galden HT 135.

A liquid cooling system for cooling electronic components is described in DE 10 2006 041 788 A1.

It is understood that a liquid cooling system must be serviced regularly, since it cools important components such as, for example, flight control computers. The service can include the filling, emptying and deaerating of the entire liquid cooling system. Since, as described at the beginning, the cooling circuit can branch off to a multiplicity of refrigeration consumers, such servicing can be relatively elaborate. The risk of errors during the servicing of the liquid cooling system is also increased as a result.

An object of the invention is to provide a method by which a liquid cooling system of an aircraft can be easily serviced. Further, the invention is directed towards the object of providing an aircraft liquid cooling system that is easy to service, as well as a device for servicing such an aircraft liquid cooling system.

This object is achieved by a service method having the features of Claim 1, an aircraft liquid cooling system having the features of Claim 13 and an aircraft liquid cooling service device having the features of Claim 14.

In a method, according to the invention, for servicing at least a portion of a liquid cooling system of an aircraft or a component of the liquid cooling system, an information transfer is set up between a liquid cooling service device and a liquid cooling control device or between the liquid cooling service device and the component of the liquid cooling system, in order to exchange at least one instruction between the liquid cooling service device and the liquid cooling control device or the component of the liquid cooling system. At least one first instruction is sent from the liquid cooling service device to the liquid cooling control device or to the component. The liquid cooling control device or the component of the liquid cooling system can thereby be switched to a service state.

In the method according to the invention, the liquid cooling service device can further be connected to a coolant reservoir of the liquid cooling system, in which liquid coolant is separated by a diaphragm from a compressible fluid, in order to supply compressible fluid into the coolant reservoir or in order to discharge compressible fluid from the coolant reservoir. As an alternative or in addition thereto, in the method according to the invention, the liquid cooling service device is connected to the liquid cooling system or to the component of the liquid cooling system, by means of at least one cooling-circuit service line, in order to supply coolant to the liquid cooling system or to the component from the liquid cooling service device, or in order to discharge coolant from the liquid cooling system or from the components into the liquid cooling service device.

The liquid cooling service device can be a mobile device that, for example, is provided with wheels, to enable it to be moved to an aircraft. The liquid cooling service device can have batteries, in order to provide an electric power supply. It is also possible, however, for an internal combustion engine, for example a diesel engine, to be provided in the liquid cooling service device, in order to supply the latter with energy, for example electrical energy, during the servicing operation.

Further, the liquid cooling service device can comprise a container for nitrogen, which is used as the previously described compressible fluid. Further, the liquid cooling service device can comprise a tank for coolant. Further, the liquid cooling service device can comprise a plurality of non-return valves and pumps, in order that the compressible fluid and/or the coolant can be passed to and from the aircraft.

The liquid cooling service device can further have an operator control system. The operator control system can be a computer having a touch-sensitive monitor screen or a conventional keyboard. The operator control system can also be constituted by a plurality of switches and keys, as well as a display device. The operator control system can send data to the liquid coolant control device and/or receive data from the latter. The data can comprise an instruction for the liquid cooling control device to enter a service state. Further, the data can contain an instruction concerning which type of service is to be performed. The data can also contain a response of the liquid cooling control device. Examples of such a response are the confirmation of an instruction, information concerning the current state of the liquid cooling control device and of the liquid cooling system, the failure of an instruction, etc.

The liquid cooling control device can be adapted to control a refrigeration source and a pump of a liquid cooling system of an aircraft. Further, the liquid cooling control device can be adapted to control at least one non-return valve in the cooling circuit and/or at least one refrigeration consumer in the cooling circuit. The liquid coolant control device can have a so-termed automatic state, in which the liquid coolant control device controls, for example, the pump and the refrigeration source according to the refrigeration demand of the cooling circuit. At least one temperature sensor can be provided for this purpose. The liquid cooling control device can determine the rotational speed of the pump and/or the refrigerating capacity of the refrigeration source. In the service state, the liquid cooling system does not provide any refrigerating capacity to the refrigeration consumers. It is possible, in the service state, for the pump and/or the refrigeration source to be switched off. It is possible, in the service state, for the liquid cooling control device to control the refrigeration consumers of a cooling circuit. It is also possible, however, in the service state, for the liquid cooling control device not to control any components of the liquid cooling system, and for these components to be controlled by the liquid cooling service device.

The method can further comprise the step of sending a second instruction from the liquid cooling service device to the liquid cooling control device, as a result of which the liquid cooling control device is switched to the previously described automatic state. After the sending of the first instruction, the liquid cooling control device remains in the service state until the second instruction is received. It is thereby prevented from being manually switched to the automatic state during the servicing of the cooling system, for example by the cabin personnel or other service personnel. As a result, for example, the refrigeration source is prevented from attempting to provide refrigerating capacity although coolant was removed during the servicing operation. This approach makes it possible to prevent damage to components of the liquid cooling system. It is understood that a protected operator control device can be provided in the liquid cooling control device, in order to switch the liquid cooling service device back to the automatic state in the event of a fault following completion of servicing. The protected operator control device can be, for example, a key or a password-protected input area of a menu.

The transfer of information can be effected by means of a cable, a wireless connection and/or an optical coupler. The liquid cooling service device can comprise a transmitter, and the liquid cooling system can comprise a corresponding receiver, for the purpose of transferring wire-conducted or wireless signals. In the case of bidirectional communication, the liquid cooling system can also comprise a transmitter, and the liquid cooling service device can also comprise a receiver. The transmitter-and-receiver pair can also be implemented by a transceiver.

The liquid cooling service device can be so realized that, during the servicing operation, it sends instructions only to the liquid coolant control device, and the latter actuates the components of the liquid cooling system. It is also possible, however, for the liquid cooling service device to be so realized that it sends instructions to the components of the liquid cooling system.

In a preferred embodiment of the method, according to the invention, for servicing a liquid cooling system, which can comprise a cooling circuit having liquid coolant, at least one refrigeration source and a refrigeration consumer, the liquid cooling service device is connected to the cooling circuit at a first location of the cooling circuit by means of a first cooling-circuit service line. Further, the liquid cooling service device is connected to the cooling circuit at a second location of the cooling circuit by means of a second cooling-circuit service line. The cooling circuit can be shut off between the first location and the second location. A liquid coolant is supplied by means of the first cooling-circuit service line, and the fluid contained in the cooling circuit, for example air, nitrogen and/or liquid coolant, is discharged from the cooling circuit by means of the second cooling-circuit service line.

This approach enables the entire liquid cooling system to be filled with liquid coolant. Via the reservoir service line mentioned at the beginning, compressible fluid can then be passed into a chamber of the coolant reservoir, which chamber is separated from the liquid coolant by the diaphragm. Nitrogen, for example, can be used as a compressible fluid. Nitrogen is preferred because it does not cause corrosion on components of the liquid cooling system, and does not introduce moisture, in the form of water vapour, into the system. In the context of this application, any gas can be used instead of nitrogen, an inert gas being preferred. Supplying compressible fluid into the chamber of the coolant reservoir prevents the pressure on the diaphragm from exceeding the maximally allowable value. In the case of a usual coolant reservoir, the maximally allowable pressure on the diaphragm is approximately 5 bar at the end points of the diaphragm that is displaceable in the coolant reservoir. Between the end points, the maximally allowable pressure on the movable diaphragm is approximately 3.5 bar.

The first location can be at the intake of a refrigeration source, which, in normal operation, delivers cooled, liquid coolant. Refrigeration consumers are arranged downstream from the refrigeration source. A coolant reservoir can be connected to the cooling circuit, down-stream from the refrigeration consumers. From the coolant reservoir connection, the coolant flows back to the refrigeration source. The second location can be downstream from the connector location of the coolant reservoir and upstream from the first location.

A first non-return valve can be provided between the first location and the second location, which valve can block the cooling circuit between the first location and the second location during the servicing operation. The first non-return valve can be actuated manually or automatically, for example by means of the liquid cooling control device.

When the first non-return valve is closed, the liquid coolant flows from the first cooling-circuit service line into the liquid cooling system. A fluid, for example nitrogen or coolant, contained in the liquid cooling system emerges from the liquid cooling system, at the second location, into the second cooling-circuit service line, and goes from there into the liquid cooling service device.

A connector for a third cooling-circuit service line can be provided at the output of the refrigeration source. By means of the third cooling-circuit service line, coolant can be supplied to the cooling circuit or carried away from the latter.

A reservoir deaeration line can be connected in the coolant-reservoir chamber that is provided for coolant. A fourth cooling-circuit service line can be connected to the reservoir deaeration line. The coolant reservoir, and consequently the cooling circuit, can be filled with coolant and/or a fluid, for example air or nitrogen, that may be present in the cooling circuit can be removed via the reservoir deaeration line and the fourth cooling-circuit service line.

It is understood that, during the filling of the cooling circuit, all non-return valves that are assigned to a refrigeration consumer for the purpose of enabling coolant to flow through the refrigeration consumer are open. Preferably, these non-return valves are so realized that the non-return valves open if no electric power is supplied to the non-return valve. After the entire liquid cooling system has been filled with coolant, at least one particularly critical component of the liquid cooling system, for example the refrigeration source, can be additionally filled with coolant, as described in the following, in order to increase the reliability of the servicing procedure. Further, the entire cooling circuit and/or the particularly critical component can be deaerated, as likewise described in the following.

A so-termed service panel can be provided on the aircraft to enable the cooling-circuit service lines, the reservoir service line and a possible communication line to be connected to the aircraft. On the service panel there are at least four connectors for the cooling-circuit service lines, and a connector for the reservoir service line, as well as, optionally, a connector for a communication line. The connectors provided on the aircraft for the cooling-circuit service lines and the reservoir service line can be so realized that they function both as a connector device and as a non-return valve device. This means that a flow of fluid is rendered possible as soon as a cooling-circuit service line or a reservoir service line is connected, and there is no need for switching of an additional non-return valve.

A special instruction can be provided, by which the liquid cooling service device puts the liquid cooling control device into a state in which complete filling of the cooling circuit is rendered possible. It is understood that this instruction can be divided into a plurality of instructions, each of which initiates a step for filling of the cooling circuit. Further instructions can be provided, for example for filling the particularly critical component, for deaerating the particularly critical component and for deaerating the entire liquid cooling system.

Following the filling of the liquid cooling system, the fill level of the coolant reservoir can be checked and set in an additional step, which is described in the following.

In a further development of the method for servicing a liquid cooling system, which can have a cooling circuit comprising liquid coolant, at least one refrigeration source, at least one refrigeration consumer and at least one cooling-liquid reservoir, the liquid cooling service device can be connected to the cooling circuit at a first location of the cooling circuit by means of a first cooling-circuit service line. Further, the liquid cooling service device can be connected to the cooling circuit at a second location of the cooling circuit by means of a second cooling-circuit service line. The cooling circuit can be shut off between the first and the second location. A gas, for example nitrogen, is supplied by means of the first cooling-circuit service line, and coolant is removed from the cooling circuit by means of the second cooling-circuit service line.

A compressible fluid can be routed via the reservoir service line, in order to assist the emptying of the coolant reservoir. If all refrigeration consumers are so realized that a non-return valve, assigned to the refrigeration consumer to enable coolant to flow through the refrigeration consumer, opens if no electric power is applied to the non-return valve, the liquid cooling system can also be emptied if the non-return valve, and in particular the liquid cooling control device, is not supplied with electric power.

If the liquid cooling system is supplied with power, the liquid cooling service device and/or the liquid cooling control device can issue an instruction for the non-return valve assigned to the refrigeration consumer to be opened. If there are a plurality of refrigeration consumers, initially all non-return valves assigned to the refrigeration consumers can be opened simultaneously. A plurality or all non-return valves assigned to the refrigeration consumers, with the exception of one non-return valve assigned to a refrigeration consumer, can then be closed. It can thereby be ensured that the refrigeration consumer whose non-return valve is opened is emptied in a particularly reliable manner. A particularly critical component of the liquid cooling system can then be emptied separately, as described in the following. If the liquid cooling system is supplied with electric power, one or more instructions can be sent from the liquid cooling service device to the liquid cooling control device. It is possible for the liquid cooling service device or the liquid cooling control device to take over the control of the emptying operation and thus, for example, the control of the non-return valves of the refrigeration consumers.

The liquid cooling control device and/or the liquid cooling service device can be so realized that, if the liquid cooling system is not supplied with electric power at the start of the emptying procedure and the electric power supply is switched on during emptying, the liquid cooling control device is prevented from entering the automatic state. This can be effected in that the liquid cooling control device checks whether there is a communication connection to the liquid cooling service device. If there is such a connection, the liquid cooling control device can ask the liquid cooling service device whether a service is being performed. It is also possible for the liquid cooling service device to check cyclically whether a communication connection to the liquid cooling control device has been established. If such a communication connection is identified, the liquid cooling service device can send the first instruction, in order for the liquid cooling control device to enter the service state. If a cable is used for the transfer of information, the liquid cooling control device can then already enter the service state if it is identified that a cable is connected to the service panel. This is possible in all developments of the service method.

In a further development of the method for servicing a liquid cooling system, which can have a cooling circuit comprising liquid coolant, at least one refrigeration source and at least one refrigeration consumer, the liquid cooling service device is connected to the cooling circuit at a first location of the cooling circuit by means of a first circuit service line. Further, the liquid cooling service device is connected to the cooling circuit at a second location of the cooling circuit by means of a second cooling-circuit service line. The cooling circuit can be shut off between the first and the second location. Liquid coolant is supplied by means of the first cooling-circuit service line and discharged by means of the second cooling-circuit service line.

In this approach, the entire liquid cooling system can be deaerated. For this purpose, the liquid cooling service device can send an instruction to the liquid cooling control device, in order for the liquid cooling control device so to control the components of the liquid cooling system that deaeration is rendered possible. It is also conceivable, however, for the liquid cooling service device to take over the control of the components of the liquid cooling system during the deaeration operation.

During the deaeration operation, all previously mentioned non-return valves assigned to the refrigeration consumers are open. The coolant reservoir, and consequently the entire cooling circuit, can be pressurized via the reservoir service line. The first location and the second location can be at the previously described places of the cooling circuit. During the deaeration operation, the liquid coolant can flow, at varying volumetric flow rates and/or varying pressures, through the liquid cooling system, the first cooling-circuit service line, the second cooling-circuit service line and through the liquid cooling service device. The liquid coolant can be cleaned in the liquid cooling service device as it circulates through the liquid cooling service device. Further, the liquid cooling service device is also deaerated. The coolant reservoir can be deaerated in that coolant flows into the liquid cooling system via the first or the second cooling-circuit service line and fluid and/or coolant flows out of the reservoir deaeration line into a fourth cooling-circuit service line. A user can be asked cyclically, by a user interface of the liquid cooling service device, whether air bubbles can still be seen in an inspection glass of the liquid cooling service device. If air bubbles can still be seen, the system can repeat at least one of the preceding steps. A valve, through which air can be let out of the cooling circuit, can be provided in the liquid cooling system and/or in the liquid cooling service device.

Following the deaeration operation, the shut-off of the portion of the cooling circuit between the first location and the second location can be undone, and the reservoir fill level can be checked and set, as described in the following.

In a further development of the method for servicing a liquid cooling system, which can have a cooling circuit comprising liquid coolant, at least one refrigeration source, at least one refrigeration consumer and at least one cooling liquid reservoir, the liquid cooling service device is connected to the cooling circuit at a second location of the cooling circuit by means of a second cooling-circuit service line. Further, the liquid cooling service device is connected, by means of the reservoir service line, to the coolant reservoir of the liquid cooling system, in which liquid coolant is separated by a diaphragm from a compressible fluid. The cooling circuit is shut off between the second location and a portion of the cooling circuit leading away from the coolant reservoir. Via the reservoir service line, compressible fluid is carried from the liquid cooling service device to the chamber of the coolant reservoir that is separated by the diaphragm from the liquid coolant. Liquid coolant is supplied to the coolant reservoir, by means of the second cooling-circuit service line, from the liquid cooling service device. This approach is necessary if, for example because of a leakage, coolant has come out of the cooling circuit. The fill level of the coolant reservoir can then be checked and/or set, as described in the following.

For this purpose, as in the other embodiments, instructions can be exchanged between the liquid cooling service device, the liquid cooling control device and/or the components.

In a development of a method for servicing a component of the liquid cooling system, which can have a cooling circuit comprising liquid coolant, at least one refrigeration source and at least one refrigeration consumer, the liquid cooling service device is connected to the cooling circuit at a first location of the cooling circuit by means of a first cooling-circuit service line. Further, the liquid cooling service device is connected to the cooling circuit at a third location of the cooling circuit by means of a third cooling-circuit service line. The first location can be close to an inlet to a critical, component, for example the refrigeration source, and the third location can be close to an outlet of the critical component. The cooling circuit can be shut off between the first location and a portion leading away from the at least one component to be serviced. The previously described first non-return valve can be used for this purpose. Further, the cooling circuit can be shut off between the third location and a portion leading away from the at least one component to be serviced. A second non-return valve, located, for example, between the refrigeration source and the refrigeration consumers, can be used for this purpose. A liquid coolant is supplied by means of the first cooling-circuit service line, and fluid emerging from the coolant circuit, at the third location, is taken up by the third cooling-circuit service line.

With this approach, a component to be serviced, and consequently a sub-region of the liquid cooling system, can be filled. The component to be serviced can be the previously mentioned critical component. In this development, likewise, as in the other developments, instructions can be exchanged between the liquid cooling service device, the liquid cooling control device and the components. It is not necessary for the cooling system to be supplied with electric power if the first non-return valve and the second non-return valve can be actuated manually. During the filling of the component to be serviced, the coolant circulates through the component to be serviced, the first cooling-circuit service line, the third cooling-circuit service line and the liquid cooling service device, it being possible for the coolant to be cleaned in the liquid cooling service device.

Following completion of filling of the at least one component to be serviced, the first and the second non-return valve can be opened, and the fill level of the coolant reservoir can be checked and set, as described in the following. Further, following the filling of the at least one component to be serviced, the coolant can be deaerated in the liquid cooling service device.

In a further development of the method for servicing at least one component of a liquid cooling system, which can have a cooling circuit, at least one refrigeration source and at least one refrigeration consumer, the liquid cooling service device is connected to the cooling circuit at a first location of the cooling circuit by means of a first cooling-circuit service line. Further, the liquid cooling service device is connected to the cooling circuit at a third location of the cooling circuit by means of a third cooling-circuit service line. The cooling circuit is shut off between the first location and a portion leading away from the at least one component to be serviced. Further, the cooling circuit is shut off between the third location and a portion leading away from the at least one component to be serviced. A gas can be supplied by means of the first cooling-circuit service line, and coolant is discharged from the cooling circuit by means of the third cooling-circuit service line.

In this development, likewise, the first location, the third location, the first non-return valve and the second non-return valve are at the previously mentioned places in respect of the at least one critical component to be serviced. Further, the previously mentioned instructions can be used. In this development, the at least one component to be serviced can be emptied. If the first non-return valve and the second non-return valve are actuated mechanically, the liquid cooling system need not be supplied with electric power.

In a further development of the method for servicing at least one component of a liquid cooling system, which can have a cooling circuit, at least one refrigeration source and at least one refrigeration consumer, the liquid cooling service device is connected to the cooling circuit at a first location of the cooling circuit by means of a first cooling-circuit service line. Further, the liquid cooling service device is connected to the cooling circuit at a third location of the cooling circuit by means of a third cooling-circuit service line. The cooling circuit is shut off between the first location and a portion leading away from the at least one component to be serviced. Further, the cooling circuit is shut off between the third location and a portion leading away from the at least one component to be serviced. The first cooling-circuit service line, the third cooling-circuit service line, the first non-return valve and the second non-return valve can be arranged as described previously in respect of the filling and emptying of the at least one component to be serviced. Further, the seventh development includes the supplying of a fluid through the first cooling-circuit service line and the discharging of the fluid from the cooling circuit through the third cooling-circuit service line. This development makes it possible to perform a leakage test of the at least one component to be serviced. If the first non-return valve and the second non-return valve are actuated mechanically, this leakage test can be performed without the need to supply the liquid cooling system with electric power. The fluid is preferably nitrogen, since nitrogen does not cause corrosion of the components of the liquid cooling system and does not introduce moisture into the liquid cooling system. In this development, likewise, instructions, as described previously, can be exchanged between the liquid cooling service device, the liquid cooling control device and/or the at least one component to be serviced, provided that these devices and components are supplied with electric power. The leakage test can also be performed in the filled state. In order to repair the leakage location, the cooling liquid must be let out, for example upon replacing pipelines. Moreover, certain system components can only be replaced in the emptied state.

In a further development of a method for servicing a liquid cooling system, which can have a cooling circuit, at least one refrigeration source, at least one refrigeration consumer and at least one cooling liquid reservoir, the liquid cooling service device is connected to the cooling circuit at a first location of the cooling circuit by means of a first cooling-circuit service line. Further, the liquid cooling service device is connected to the cooling circuit at a second location of the cooling circuit by means of a second cooling-circuit service line. The cooling circuit is shut off between the first and the second location. A fluid is supplied by means of the first cooling-circuit service line, and the fluid is discharged by means of the second cooling-circuit line.

The first location, the second location and the first non-return valve can be located at the previously stated places. Also, as described previously, instructions can be sent from the liquid cooling service device to the liquid cooling control device. With this approach, a leakage test of the entire liquid cooling system can be performed. If the first non-return valve is actuated mechanically, the leakage test can be performed without the supply of electric power.

In a development of the service method, according to the invention, that enables a fill-level sensor of a coolant reservoir of a liquid cooling system to be serviced, the liquid cooling service device is connected, by means of a reservoir service line, to the coolant reservoir of the liquid cooling system in which liquid coolant is separated by a diaphragm from a compressible fluid. Compressible fluid contained in the coolant reservoir is discharged from the coolant reservoir via the reservoir service line. The fill-level sensor and/or the pressure sensor of the coolant reservoir can then be serviced, for example checked, repaired and/or replaced. Finally, compressible fluid, for example nitrogen, is supplied from the liquid cooling service device via the reservoir service line. In this development of the service method, the liquid cooling system need not be supplied with electric power.

In an embodiment of the service method, according to the invention, that serves to adapt the state of a coolant reservoir of a liquid cooling system, the liquid cooling service device is connected, by means of a reservoir service line, to the coolant reservoir of the liquid cooling system in which liquid coolant is separated by a diaphragm from a compressible fluid. Further, the liquid cooling service device is connected to the cooling circuit at a second location by means of a second cooling-circuit service line, the second location being in fluid communication with the liquid coolant in the coolant reservoir. An actual pressure of the compressible fluid and an actual quantity of the liquid coolant are determined. A compressible fluid is supplied via the reservoir service line if the actual pressure of the compressible fluid is less than a setpoint pressure, and a compressible fluid is discharged via the reservoir service line if the actual pressure of the compressible fluid is greater than a setpoint pressure. Liquid coolant is supplied via the second cooling-circuit service line if the actual quantity of the liquid coolant is less than a setpoint quantity, and liquid coolant is discharged via the second cooling-circuit service line if the actual quantity of the liquid coolant is greater than a setpoint quantity.

As described previously, the reservoir service line and the second cooling-circuit service line can be connected to the liquid cooling system. The checking and/or setting of the fill level of the coolant reservoir can be effected with the electric power supply to the liquid cooling system either switched-on or switched-off.

In all previously described developments of the service method, the liquid cooling control device is prevented from switching from the service state to the automatic state, as described at the beginning. Further, in all previously described developments, it is ensured, as described at the beginning, that the liquid cooling control device does not enter the automatic state if there is a communication connection to the liquid cooling service device.

If a cooling-circuit service device is to supply coolant to the liquid cooling system, in all previously described developments of the service method the respective cooling-circuit service line can be deaerated. For this purpose, liquid coolant is pumped into the cooling-circuit service line, until the coolant emerges from the cooling-circuit service line. The cooling-circuit service line can then be connected to a corresponding connector on the service panel. It is thereby ensured that as little air as possible enters the liquid cooling system. It is understood that, if the cooling-circuit service line is to supply a compressible fluid to the liquid cooling system, coolant is removed from the cooling-circuit service line before the cooling-circuit service line is connected.

An aircraft liquid cooling system according to the invention comprises a component to be serviced or a liquid cooling control device, which is connectable to a liquid cooling service device and which is set up to receive at least one first instruction from the liquid cooling service device, through which instruction the component or the liquid cooling control device is switched to a service state. Further, the aircraft liquid cooling system according to the invention can comprise a cooling circuit, through which liquid coolant can flow and which is connectable to the liquid cooling service device by means of a cooling-circuit service line, in order to supply coolant to the cooling circuit or to the component of the liquid cooling system that is to be serviced, or in order to discharge coolant from the cooling circuit or from the component of the liquid cooling system that is to be serviced. As an alternative or in addition thereto, the aircraft liquid cooling system according to the invention can have a coolant reservoir, in which liquid coolant is separated by a diaphragm from a compressible fluid. The coolant reservoir is connectable to the liquid cooling service device by means of a reservoir service line, in order to supply compressible fluid into the coolant reservoir or in order to discharge compressible fluid from the coolant reservoir.

A first non-return valve can be arranged in the cooling circuit. Further, a first branch line can be provided, the first end of which is arranged at a first side of the first non-return valve and the second end of which is arranged on the outer skin of the aircraft. The first liquid cooling service line can be connected to the first branch line if the liquid cooling system is to be serviced. Further, the liquid cooling system can have a second branch line, the first end of which is arranged at a second side of the first non-return valve and the second end of which is arranged on the outer skin of the aircraft. The previously mentioned second liquid cooling service line can be connected to the second branch line.

The liquid cooling system can further have a reservoir supply line for supplying and/or discharging compressible fluid to or from the coolant reservoir, the first end of the reservoir supply line being connected to the coolant reservoir, and the second end of the reservoir supply line being arranged on the outer skin of the aircraft. The reservoir service line can be connected to the reservoir supply line during a servicing operation. The first non-return valve can be arranged between the coolant reservoir and the refrigeration source. A third branch line, to which the third liquid cooling service line can be connected in the case of servicing, can be arranged at the outlet of a refrigeration source. There can be a second non-return valve down-stream from the connection of the third branch line. A reservoir deaeration line, to which the fourth liquid cooling service line can be connected in the case of servicing, can be connected to the chamber of the coolant reservoir that contains the coolant. It is understood that the aircraft liquid cooling system can be further developed as described previously in respect of the service method.

An aircraft liquid cooling service device according to the invention is connectable to a component to be serviced or to a liquid cooling control device of a liquid cooling system of an aircraft and be set up to send at least one instruction to the component to be serviced or to the liquid cooling control device, through which instruction the component or the liquid cooling control device is switched to a service state. Further, the liquid cooling service device according to the invention can be connectable, by means of a cooling-circuit service line, to a cooling circuit of the liquid cooling system through which liquid coolant can flow, in order to supply coolant to the cooling circuit or to the component of the liquid cooling system that is to be serviced, or in order to discharge coolant from the cooling circuit or from the component of the liquid cooling system that is to be serviced. As an alternative or in addition thereto, the liquid cooling service device can be connectable, by means of a reservoir service line, to a coolant reservoir of the liquid cooling system, in which liquid coolant is separated by a diaphragm from a compressible fluid, in order to supply compressible fluid into the coolant reservoir or in order to discharge compressible fluid from the coolant reservoir.

The liquid cooling service device can comprise a first fluid connector for delivering and/or taking up liquid coolant, and can comprise a second fluid connector for delivering and/or taking up liquid coolant. Further, the liquid cooling service device can have a pressure fluid connector for delivering and/or taking up a compressible fluid.

The liquid cooling service device can be developed further, as described previously in respect of the method. In particular, the liquid cooling service device can have a third and a fourth fluid connector for delivering and/or taking up liquid coolant, to which connector the third and the fourth liquid cooling service line, respectively, can be connected. The liquid cooling service device can have a coolant reservoir. Further, it can be set up to clean coolant. Further, coolant taken from the aircraft can be recirculated into the aircraft.

It is also possible for the liquid cooling service device to be realized to cool coolant, enabling a stationary aircraft to be cooled. Further, the liquid cooling system of the aircraft can be serviced during this cooling by the liquid cooling service device. For example, the fill level of the coolant reservoir of the liquid cooling system can be checked and set, and the liquid cooling system can be deaerated.

The liquid cooling service device can have the previously described operator control system.

Figure 2:
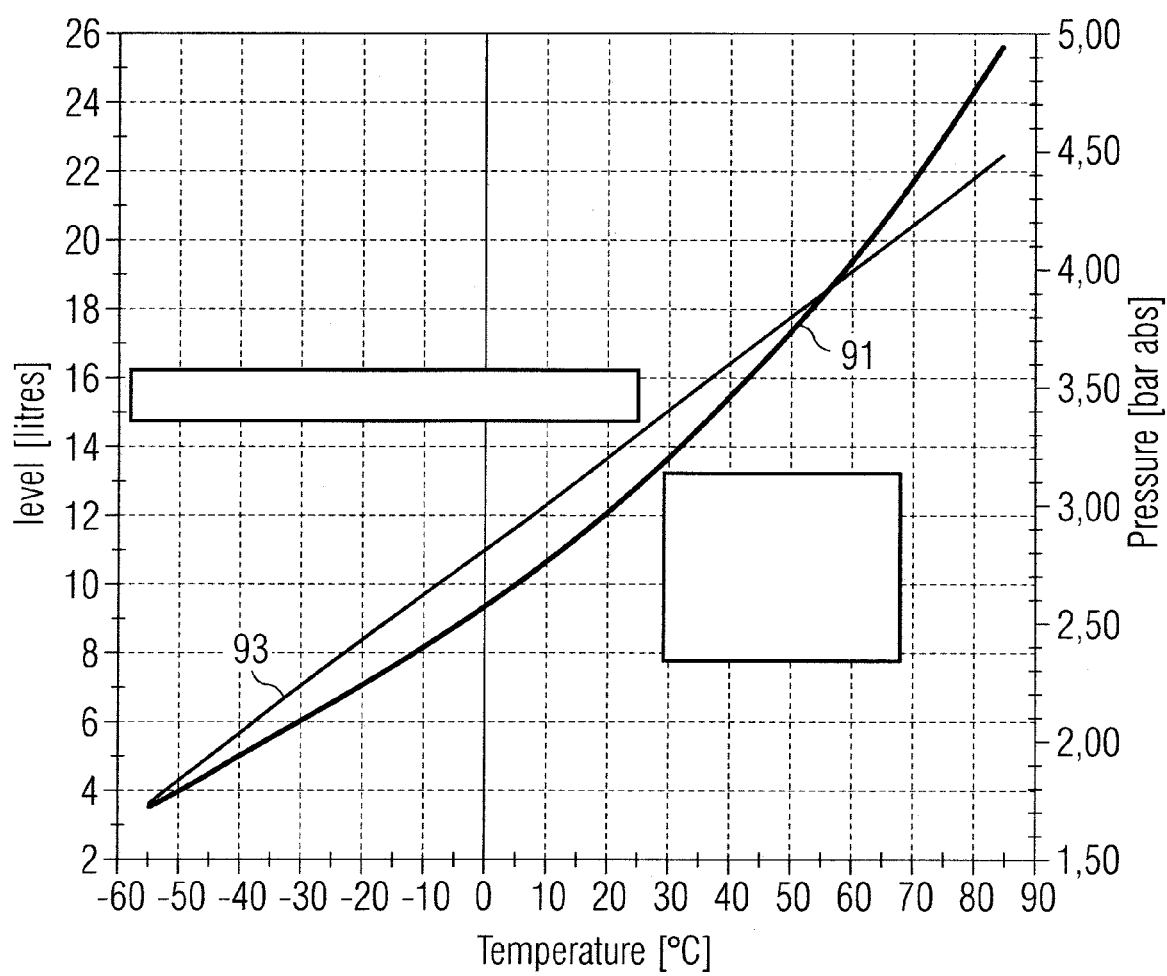
Figure 4:
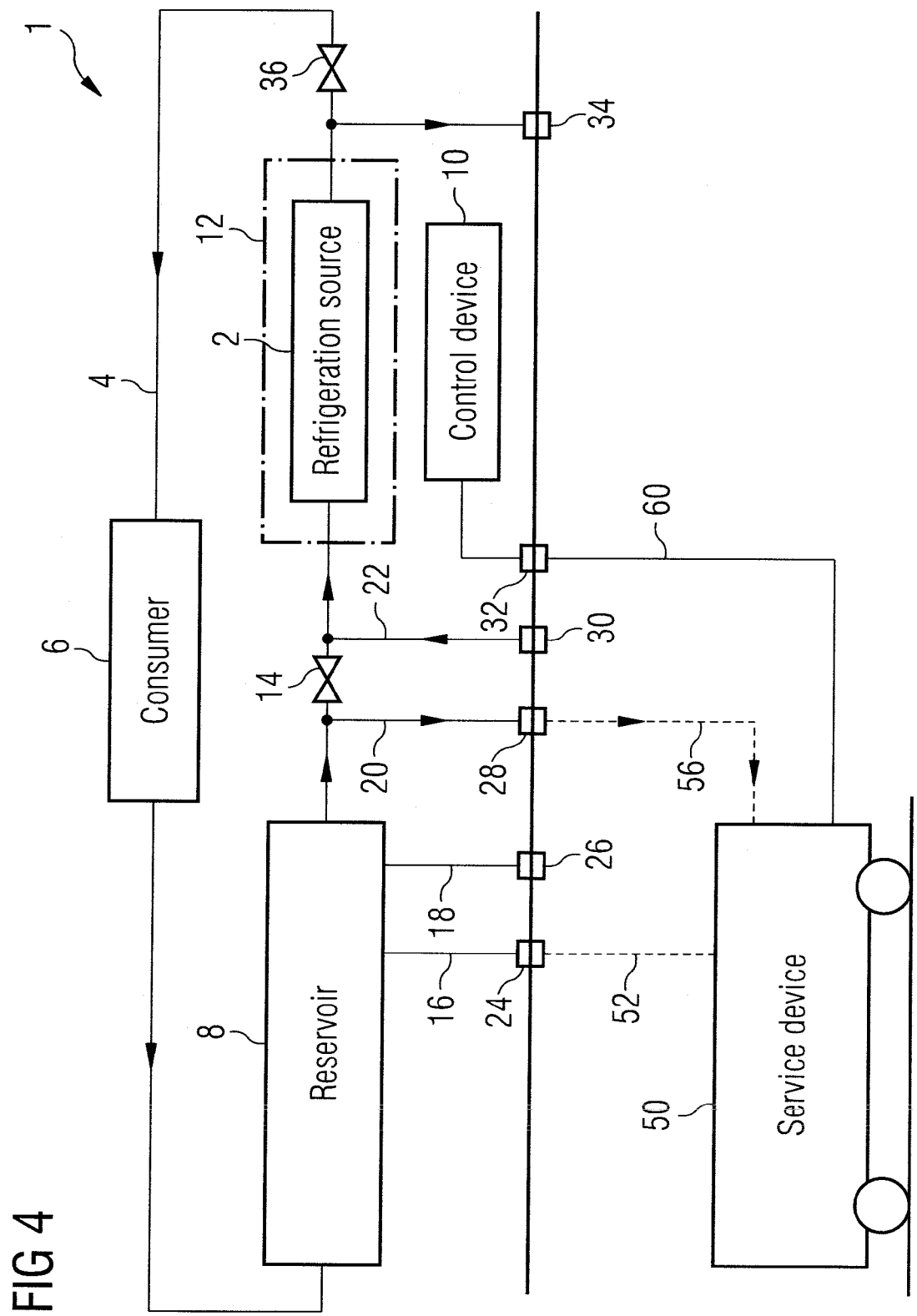
Figure 5:
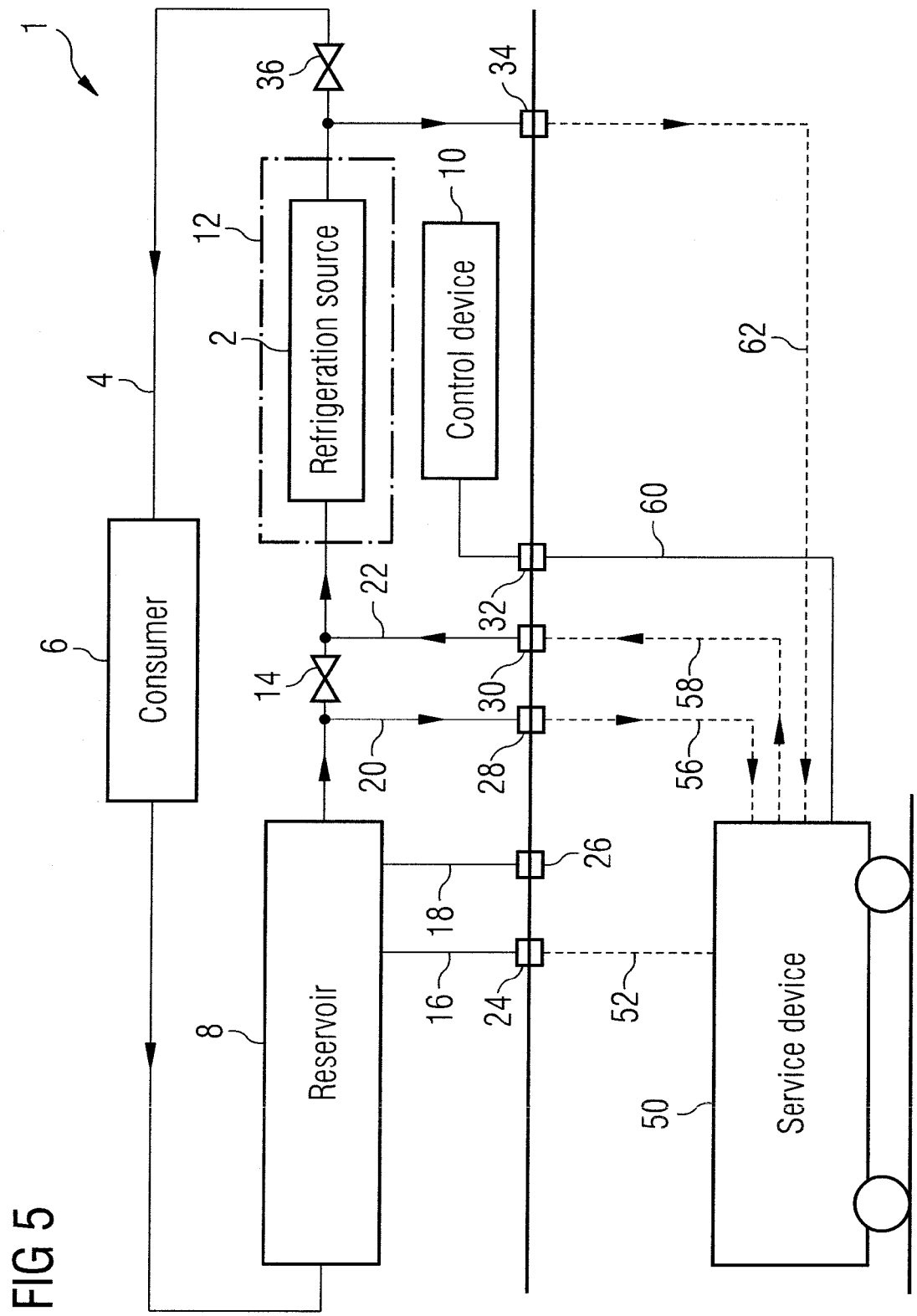
Figure 6:
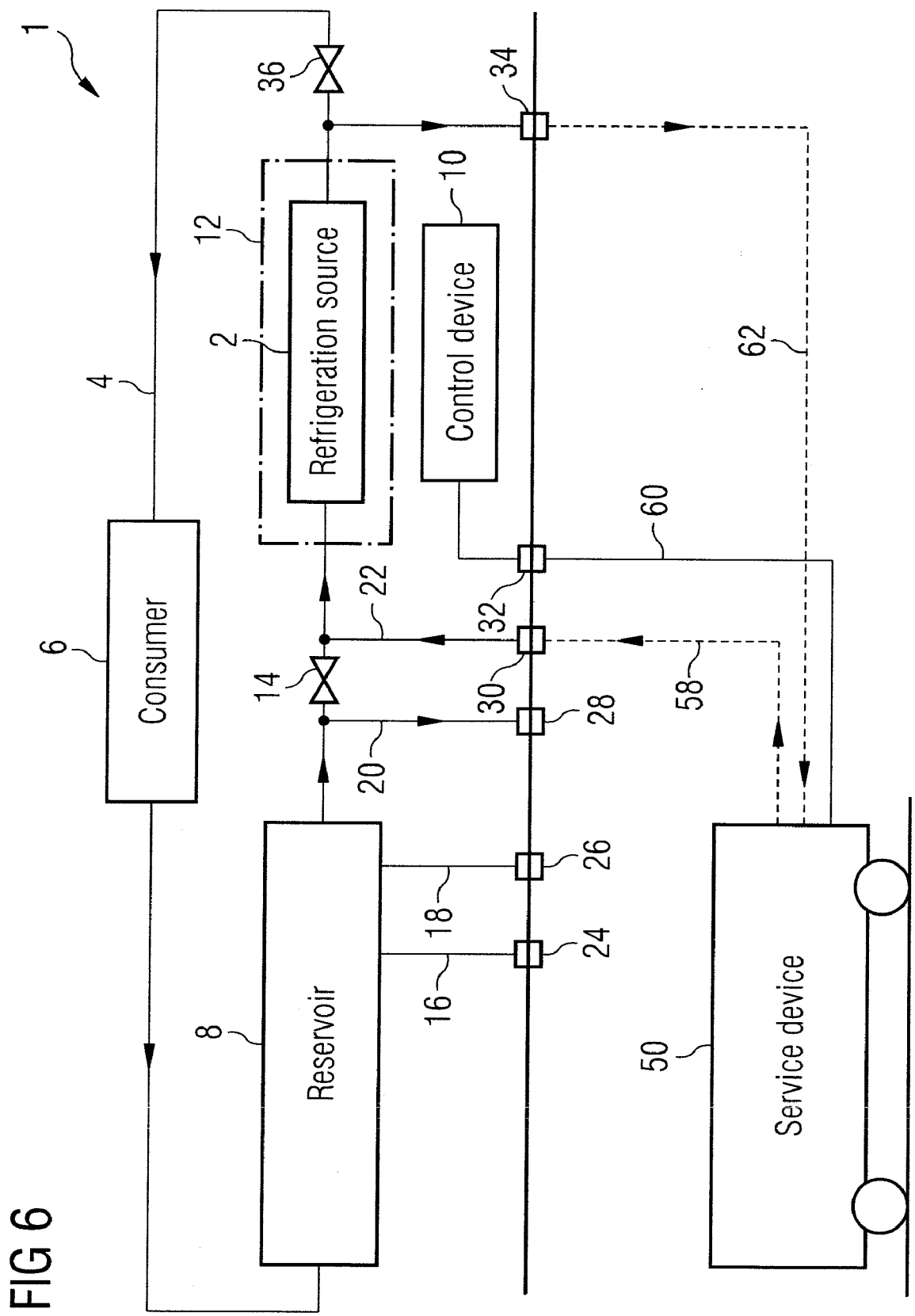
Figure 7:
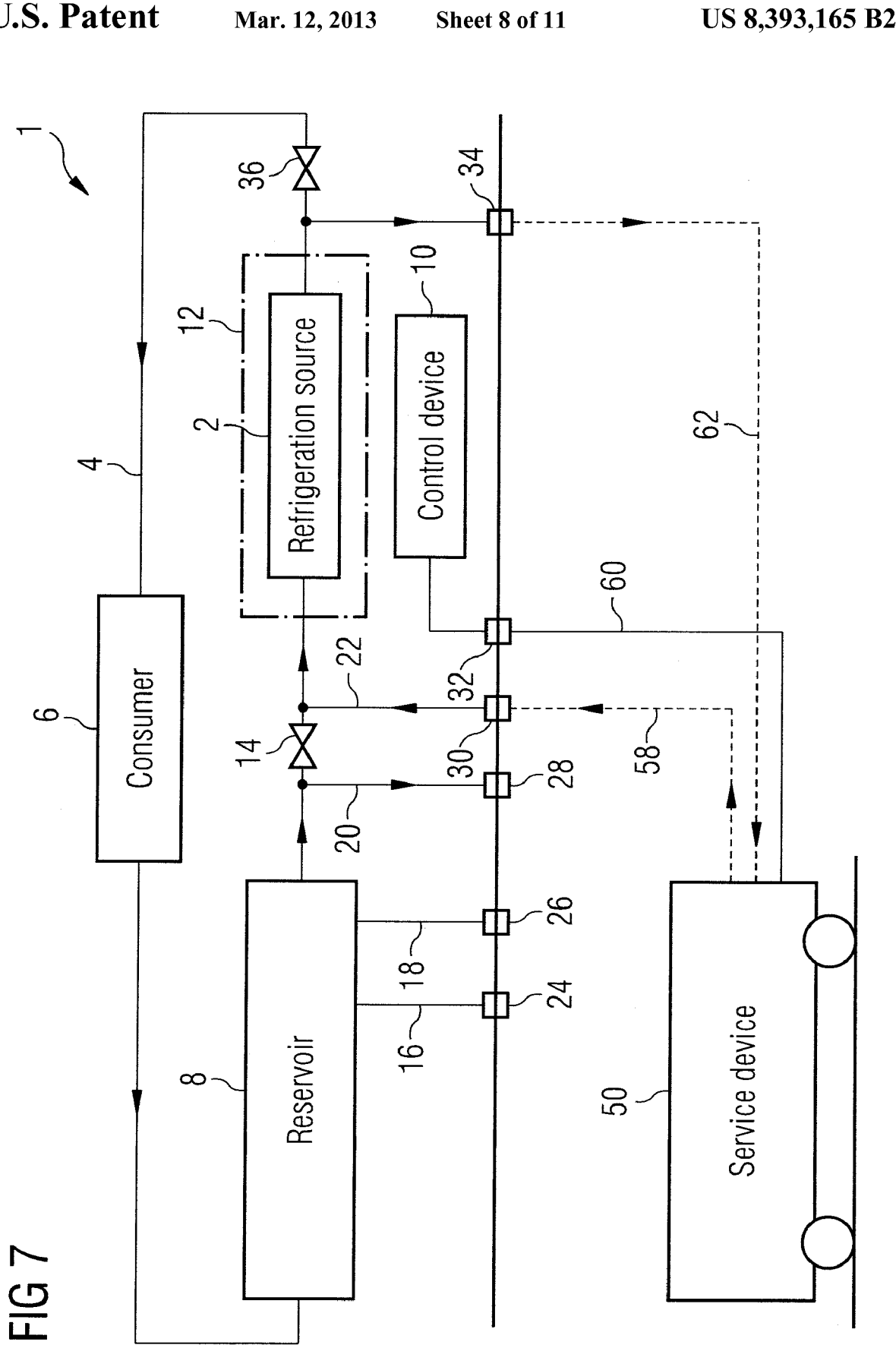
Figure 8:
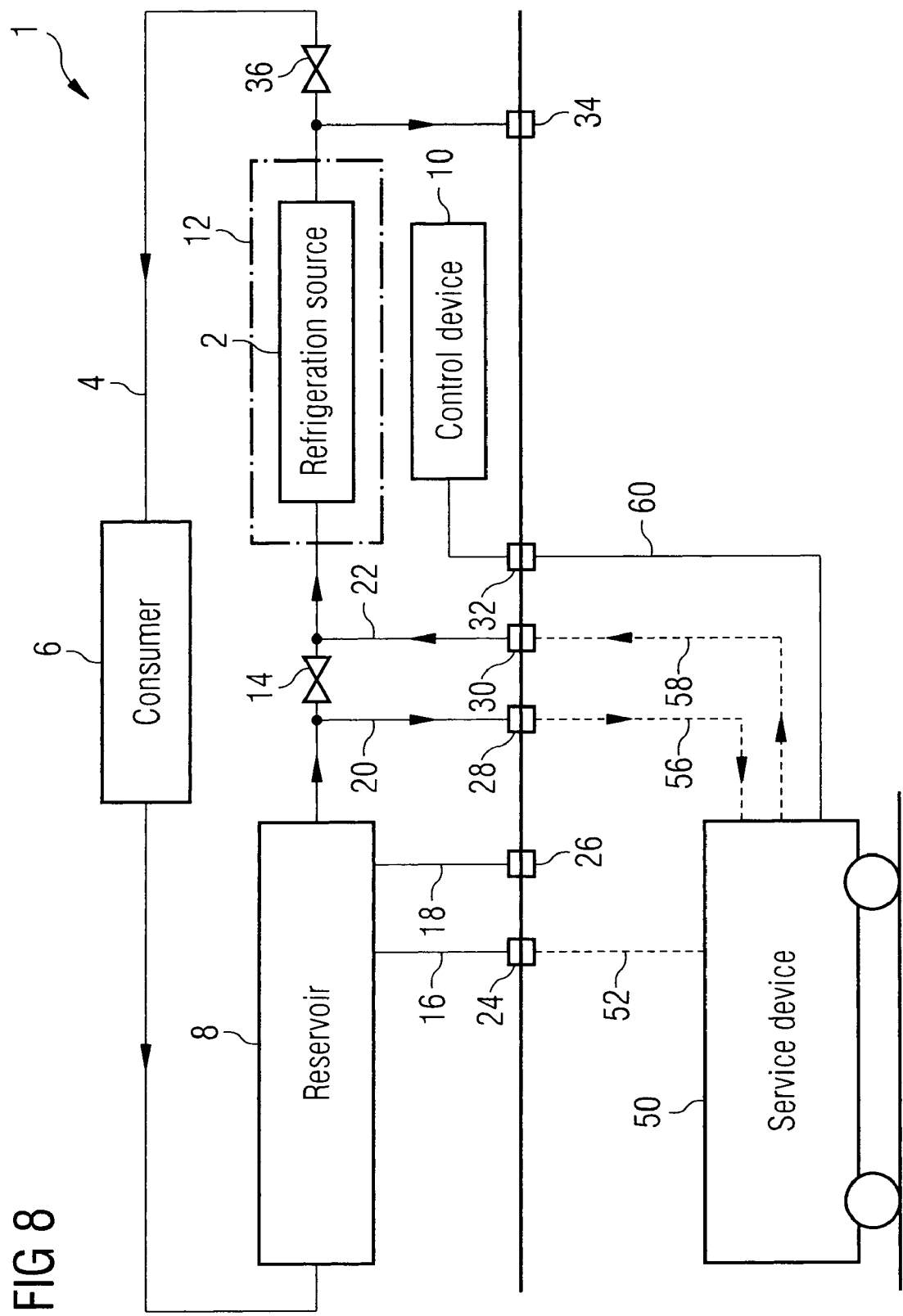
Figure 9:
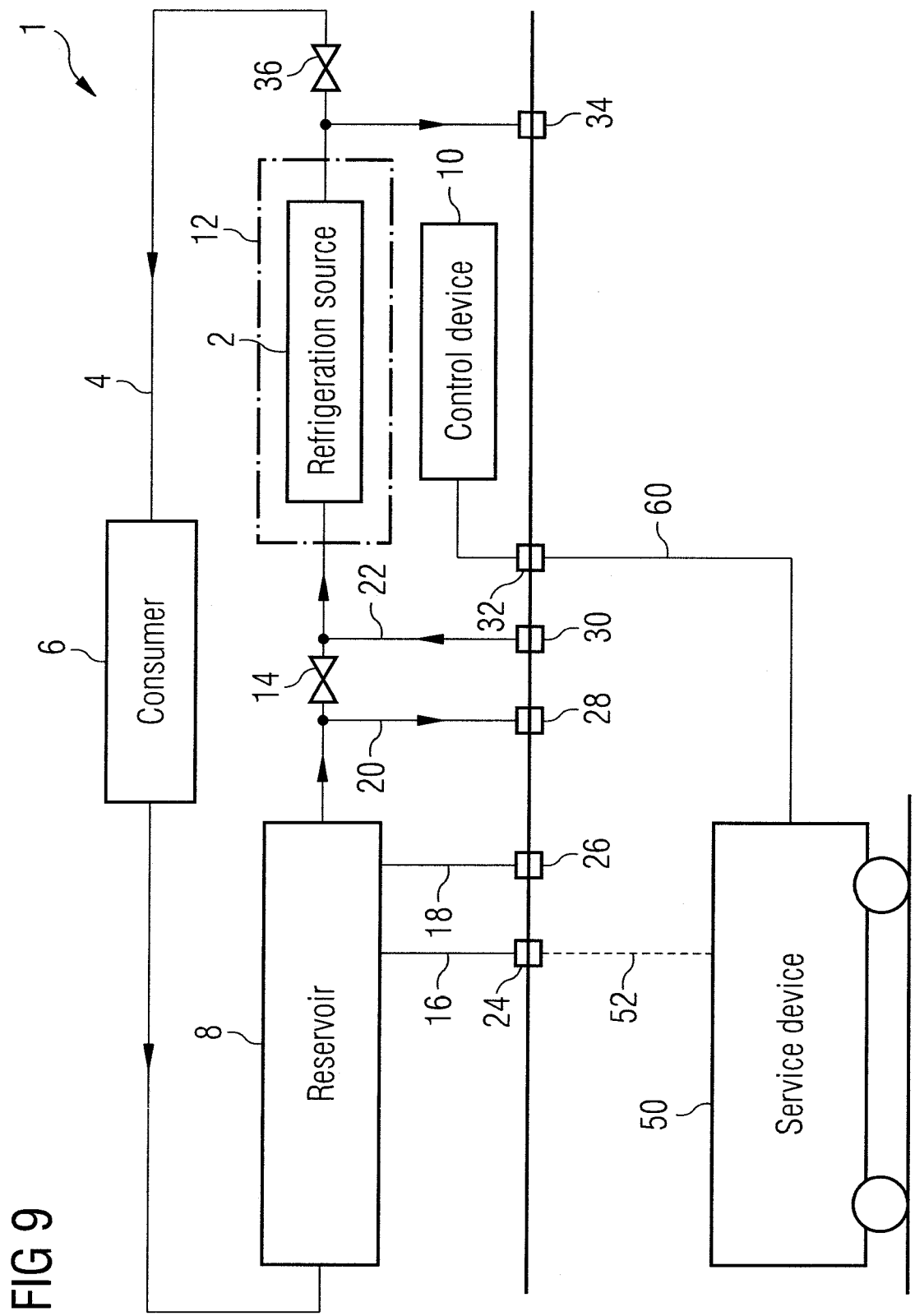
Figure 10:
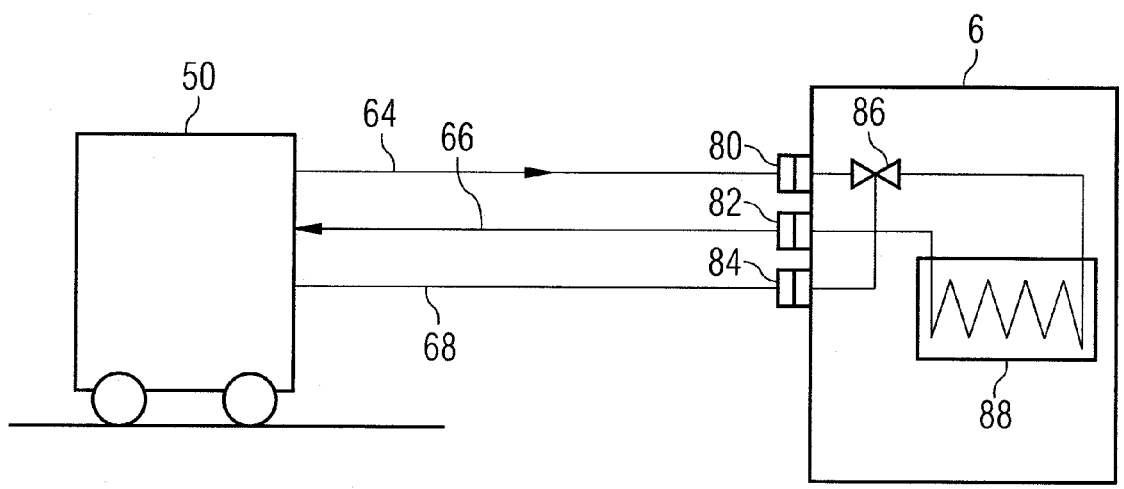
Figure 11:
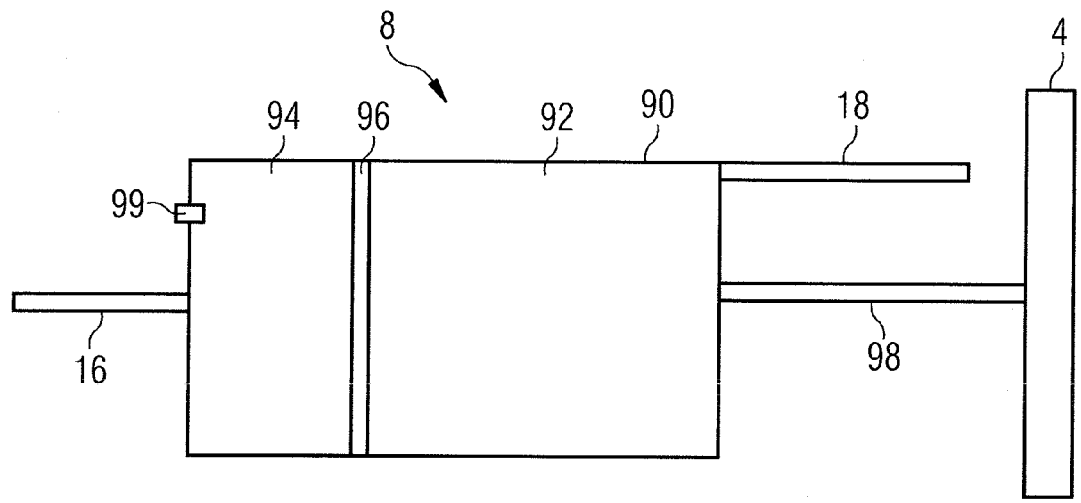

The invention is now explained in greater detail with reference to the appended drawings, wherein:

FIG. 1 shows a liquid cooling system of an aircraft, connected to which system there is a liquid cooling service device, for filling the entire liquid cooling system, for emptying the entire liquid cooling system and for deaerating the entire liquid cooling system, FIG. 2 shows a fill curve of an exemplary coolant reservoir, in which the pressure in the coolant reservoir and the fill level of the coolant reservoir are represented in dependence on the temperature, FIG. 3 shows a flow diagram, in which the steps necessary for setting the fill level in a coolant reservoir are represented, FIG. 4 shows the liquid cooling system and the liquid cooling service device according to FIG. 1, the liquid cooling service device being so connected that the coolant reservoir can be replenished, FIG. 5 shows the liquid cooling system and the liquid cooling service device according to FIG. 1, the liquid cooling service device being so connected that a sub-system of the liquid cooling system can be filled, FIG. 6 shows the liquid cooling system and the liquid cooling service device according to FIG. 1, the liquid cooling service device being so connected that a sub-system of the liquid cooling system can be emptied, FIG. 7 shows the liquid cooling system and the liquid cooling service device according to FIG. 1, the liquid cooling service device being so connected that a sub-system of the liquid cooling system can be subjected to a leakage test, FIG. 8 shows the liquid cooling system and the liquid cooling service device according to FIG. 1, the liquid cooling service device being so connected that the entire liquid cooling system can be subjected to a leakage test, FIG. 9 shows the liquid cooling system and the liquid cooling service device according to FIG. 1, the liquid cooling service device being so connected that a fill-level sensor of the coolant reservoir can be replaced, FIG. 10 shows a liquid cooling service device, which is connected to a component of a liquid cooling system for the purpose of servicing this component, and FIG. 11 shows a cross-section of a coolant reservoir of the liquid cooling system according to FIG. 1.

FIG. 1 shows a liquid cooling system 1, comprising a refrigeration source 2, a refrigeration consumer 6, referred to in the following as a consumer, a coolant reservoir 8, referred to in the following as a reservoir, and a coolant line 4, which connects the refrigeration source 2, the consumer 6 and the reservoir 8. Perfluor polyether, which is distributed, for example, as Galden HT 135 by Solvay Solexis, or a mixture of glycol and water, in particular propylene glycol and water, can be used as a coolant. The coolant is permanently in the liquid state in the cooling circuit. The refrigeration source 2 cools liquid coolant, which is delivered into the coolant line. The refrigeration source 2 can be a compression refrigerating machine, arranged, for example, outside of the pressurized fuselage, beneath the wing centre box. In this case, the compression refrigerating machine delivers the waste heat directly to the outside air. The reservoir 8 can be located outside of the pressurized fuselage. The consumer 6 can be a food trolley in a galley, an aircraft entertainment system and/or a computer, for example a flight control computer in the avionics bay.

The liquid cooling system 1 also has a liquid cooling control device 10, referred to in the following as a control device. The control device 10 is connected to the refrigeration source 2 and to the reservoir 8. The control device 10 can also communicate with the consumer 6. For reasons of clarity, the connections between the control device 10, the refrigeration source 2, the consumer 6 and the reservoir 8 are not shown. The control device 10 can measure an actual temperature of the coolant entering the refrigeration source 2 and control the refrigeration source 2 in such a way that the latter delivers the coolant with the required, setpoint temperature. A pump (not shown), which circulates the coolant through the liquid cooling system 1, can be provided in the refrigeration source 2 or in the reservoir 8.

As shown in FIG. 10, the consumer 6 can have a consumer inlet 80, a consumer outlet 82 and a consumer control connector 84. The consumer further comprises a coolant control valve 86. The coolant control valve 86 determines what quantity of liquid coolant flows through a coolant/air heat exchanger 88. The coolant control valve 86 can be connected to a temperature sensor via a consumer control device (not shown). A temperature feedback control can thereby be created. The coolant control valve 86 can also be connected to the control device 10. The control device 10 can, for example during a servicing operation, emit a signal that causes the coolant control valve 86 to be opened or closed.

It is understood that a consumer 6 or a plurality of consumers 6 can be provided in the cooling circuit. The liquid coolant can flow through such consumers in succession and/or in parallel. In this case, the control device 10 can be connected to a plurality of consumers 6, in order to open or close their coolant control valves 86. In an aircraft, a central liquid cooling system may be provided, or a plurality of liquid cooling systems may be provided. For example, two liquid cooling systems may be provided, for redundant cooling of the aircraft.

The reference 50 denotes a liquid cooling service device, referred to in the following as a service device. The service device 50 can be realized to fill, empty and deaerate the entire liquid cooling system 1 or a portion of the liquid cooling system 1, check the entire liquid cooling system 1, or a portion of the liquid cooling system 1, in respect of a possible leakage, check a reservoir fill-level sensor of the reservoir 8 and/or fill and empty individual components of the cooling system 1. For this purpose, the service device 50 can be realized as a total service device, which is set up to fill, empty and deaerate the entire liquid cooling system 1 and subject it to a leakage check. The total service device can be used in the case of a more major service, for example in a service hall. A service device 50 realized in the form of a partial service device can be used, for example, between two flights. The partial service device can be realized to replenish a reservoir 8, fill a sub-system 12 of the cooling system 1, empty the sub-system 12, subject the sub-system 12 to a leakage test, subject the entire liquid cooling system 1 to a leakage test, enable a reservoir fill-level sensor 99 to be serviced and/or fill or empty individual components 2, 6 of the liquid cooling system 1. It is understood that a total service device can also be so realized that it can perform the servicing operations described in respect of a partial service device. Both the partial service device and the total service device can be realized as mobile devices or built-in as fixed devices. In connection with this application, the term service device 50 can relate both to a partial service device and to a total service device.

The service device 50 can comprise a container for holding liquid coolant, a nitrogen reservoir, at least one pump, a communication interface, an electric power supply and a control computer. The electric power supply to the service device 50 can be effected by means of batteries, accumulators, a fuel cell, a combination of internal combustion engine and generator, and by the public supply system.

FIG. 11 shows a cross-section through the reservoir 8 used in the cooling system 1 according to FIG. 1. The reservoir 8 comprises a chamber 90, in which a diaphragm 96 can move. The chamber 90 is divided into a cooling-liquid chamber 92 and a pressure chamber 94. Nitrogen is passed into the pressure chamber 94 via a reservoir supply line 16. The cooling-liquid chamber 92 is connected to the coolant line 4 via a stub line 98. The coolant chamber 92 can be deaerated via a reservoir deaeration line 18. Via the diaphragm 96, the pressure set in the pressure chamber 94 by the nitrogen acts upon the coolant in the coolant chamber 92. This pressure also prevails in the coolant line 4, and consequently in the entire liquid cooling system 1. A reservoir fill-level sensor 99 senses the fill level of the reservoir 8. The diaphragm and/or the chambers can be made of metal.

Instead of a chamber 90, a liquid bellows may also be used. The liquid bellows and the cylinder can be realized as a single piece, for example made of metal.

Further, the liquid cooling system 1 comprises a cooling-circuit intake line 22, which is connected to the intake of the refrigeration source 2, a refrigeration-source output line 38, which is connected to the output of the refrigeration source 2, and a cooling-circuit output line 20, which is connected to the reservoir 8. The reservoir supply line 16 is connected to a reservoir supply connector 24, the reservoir deaeration line 18 is connected to a reservoir deaeration connector 26, the cooling-circuit output line 20 is connected to a cooling-circuit output connector 28, the cooling-circuit intake line 22 is connected to a cooling-circuit intake connector 30, and the refrigeration-source output line 38 is connected to a refrigeration-source output connector 34.

The aforementioned connectors 24, 26, 28, 30 and 34 are so realized that one of a plurality of service lines 52, 54, 56, 58 and 62 can be connected to each. The connectors 24, 26, 28, 30, 34 can be so realized that they act simultaneously as a connector device and as a valve. This means that, upon one of the service lines 52, 54, 56, 58 and 62 being connected to one of the connectors 24, 26, 28, 30 and 34, a flow of fluid through the connector is rendered possible. As an alternative thereto, a valve can be assigned to each connector 24, 26, 28, 30, 34, which valve renders possible or prevents the flow of fluid through the connector 24, 26, 28, 30, 34.

The reservoir supply connector 24, the reservoir deaeration connector 26, the cooling-circuit output connector 28, the cooling-circuit intake connector 30, the communication connection 32 and the refrigeration-source output connector 34 can be located on a central service panel for the liquid cooling system 1.

A reservoir service line 52, connected to the service device 50, can be connected to the reservoir supply line 16. This enables the reservoir service line 52 to supply nitrogen to, or discharge nitrogen from, the pressure chamber 94 of the reservoir 8. A first cooling-circuit service line, realized in the form of a cooling-circuit intake service line 58, referred to in the following as an intake service line, can be connected to the cooling-circuit intake line 22, through which first cooling-circuit service line the service device 50 can supply, for example, liquid coolant to the cooling system 1. A second cooling-circuit service line, realized in the form of a cooling-circuit output service line 56, referred to in the following as an output service line, can be connected to the cooling-circuit output line 20. By means of the output service line 56, the service device 50 can, for example, pass coolant into the coolant chamber 92 of the reservoir 8 or remove coolant from the cooling circuit. A third cooling-circuit service line, realized in the form of a refrigeration-source output service line 62, can be connected to the refrigeration-source output line 38, by means of which third cooling-circuit service line coolant emerging from the refrigeration source 2 can be taken up. A fourth cooling-circuit service line 54, realized in the form of a reservoir deaeration service line 54, can be connected to the reservoir deaeration line 18. This enables the service device 50 to deaerate the cooling-liquid chamber 92 of the reservoir 8.

The cooling circuit of the cooling system 1 further comprises a first non-return valve 14 and a second non-return valve 36, which valves can be actuated manually or automatically. In normal operation, the first non-return valve 14 and the second non-return valve 36 are open, such that fluid can flow through them. In the case of servicing, these non-return valves 14, 36 can be closed.

The control device 10 is further connected to a control-device connector 32, to which an electrical communication line 60 can be connected, in order to connect the control device 10 to the service device 50 for the purpose of transmitting instructions and/or data. Upon commencement of a servicing operation, the service device 50 sends an instruction to the control device 10, in order that the control device enters a so-termed service state. During the servicing operation, a pump (not shown) of the liquid cooling system 1, the refrigeration source 2 and the like, for example, can be switched off. As long as the control device 10 is in the service state it must be prevented from entering the automatic state, in which, for example, it could unwontedly activate the refrigeration source 2. The control device 10 may only return to the automatic state after the service device 50 has sent an instruction to this effect. During the service, both the control device 10 and the service device 50 can take over any necessary control of the refrigeration source 2, the pump and the consumers 6. If the liquid cooling system 1 is not supplied with electric power during the service, the control device 10 must be prevented from entering the automatic state upon the electric power supply being switched on. For example, the control device 10 can check whether the electrical communication line 60 is connected to a connector 32, or the control device 10 can send an instruction in order to check whether a service device 50 responds. In these cases, the control device 10 can enter the service state directly after switch-on.

It is understood that the service device 50 includes an operator control system (not shown). Via the operator control system, a user can select the service to be performed. Further, the operator control system can prompt the user to connect one of the service lines 52, 54, 56, 58 and 62 to the respective connector 24, 26, 28, 30 and 34. The operator control system can have, for example, a touch-sensitive screen.

Described in the following is a servicing operation for filling the entire liquid cooling system 1. For this purpose, the service device 50 must be realized as a total service device. The service device 50 fills the service lines 54, 56, 58 and 62 with liquid coolant. The service lines 54, 56, 58, 62 can be realized as hoses, which are rolled onto electrically operated hose reels in the service device 50. Further, the reservoir service line 52 is filled with nitrogen. The user is prompted to connect the electrical communication line 60 to the communication connector 32. The service device 50 sends an instruction for the control device 10 to enter the service state, in particular the filling service state. The user is prompted to connect the reservoir service line 52 to the reservoir supply connector 24. Further, the service device 50 prompts the user to connect the reservoir deaeration service line 54 to the reservoir deaeration connector 26, to connect the output service line 56 to the cooling-circuit output connector 28, to connect the input service line 58 to the cooling-circuit input connector 30, and to connect the refrigeration source output service line 62 to the refrigeration-source output connector 34. The user can confirm the correct connection of the lines, or the service device can verify the correct connection through pressure measurements. As soon as the correct connection of the service lines has been verified, the control device 10 or the service device 50 issues an instruction to the consumers 6 for each consumer to open the coolant control valve 86 (see FIG. 10) assigned to it. The non-return valve 14 is closed manually or closed automatically by the service device 50 or the control device 10. It is thereby ensured that coolant can flow into the consumers 6.

Nitrogen is passed into the pressure chamber 94 (see FIG. 11) of the reservoir 8 via the reservoir service line 52. This is necessary in order to build up an initial pressure in the reservoir 8, since the pressure across the diaphragm, if it is at a stop position, may be maximally about 5 bar and, if it is not at a stop position, may be maximally about 3.5 bar. Next, liquid coolant is supplied to the system via the intake service line 58, and a fluid that is present in the cooling circuit, for example nitrogen or air, and/or coolant, is carried away from the liquid cooling system 1 via the output service line 56 and the reservoir deaeration service line 54. For this purpose, the liquid coolant can circulate through the service device 50, and be cleaned, dehydrated and redelivered.

In the case of filling of the entire liquid cooling system 1, the latter is preferably supplied with electric power. It can thereby be ensured that all coolant control valves 86 of the consumers 6 are open, even if these valves are not opened automatically in the de-energized state, and, further, as described in the following, the fill level of the reservoir 8 and/or the pressure in the reservoir 8 can be set.

In the next step, a sub-system 12 of the cooling system 1, which sub-system, in the case of this embodiment, consists of the refrigeration source 2, can be filled and deaerated via the intake service line 58 and the refrigeration-source output service line 62, as described in greater detail in the following. The cooling circuit is then deaerated, in that coolant is supplied, at differing volumetric flow rates and pressures, via the intake service line 58, and is carried away via the output service line 56. Further, the cooling circuit is deaerated in the service device 50. For this purpose, the user of the service device 50 can be prompted to check whether the inspection glass of the service device 50 and/or of the liquid cooling system 1 still shows air. If the inspection glass still shows air, the deaeration of the cooling circuit of the liquid cooling system 1 and/or of the service device 50 is repeated. The air is removed automatically from the liquid coolant. As an alternative thereto, a valve can be provided in the liquid cooling system 1 and/or in the service device 50, which valve can be opened by a user for the purpose of deaeration.

Next, the reservoir is deaerated. For this purpose, coolant is supplied to the coolant chamber 92 of the reservoir 8 via the intake service line 58, until no more air emerges from the coolant chamber 92, i.e. until, for example, coolant that does not contain any air is supplied to the service device 50 via the reservoir deaeration service line 54.

The terms "air" and "deaerate" are not limited to the gaseous mixture, substantially of nitrogen and oxygen, that is present in the atmosphere. It is understood that other fluids may be present in lines of the liquid cooling system, for example more or less pure nitrogen, forced into the lines of the liquid cooling system 1 during a service step.

As soon as the service device 50 supplies coolant to the liquid cooling system 1, it must monitor the temperature of the supplied coolant and, if necessary, cool it to an admissible range. For this purpose, the service device 50 can have a cooling device, which keeps the temperature of the coolant within a wanted range. For example, the cooling device of the service device 50 is switched on in the case of a coolant temperature of over 40° C., and to switched off in the case of a coolant temperature of below 37° C. If the temperature of the coolant exceeds approximately 75° C., the user is warned and, if the temperature of the coolant exceeds approximately 80° C., the service device 50 does not supply any coolant to the liquid cooling system 1, and the entire procedure is interrupted.

The non-return valve 14 is then opened, such that the cooling circuit of the liquid cooling system 1 is re-closed.

The fill level of the reservoir 8 is then checked and, if necessary, is set. For this purpose, the liquid cooling system 1 must be supplied with electric power, to enable the reservoir fill-level sensor 99 to determine the fill level of the reservoir 8. Reference is made to FIG. 2. The curve 91 shows schematically the course of the pressure in dependence on the temperature. The curve 93 shows schematically the course of the fill level in dependence on the temperature. These curves must be determined separately for each reservoir type.

A procedure for setting the fill level of the reservoir 8, which commences with step 100, is now described with reference to FIG. 3. This procedure can be performed by the service device 50, the control device 10 or by both. In step 102, a reference value, i.e. a set-point value, for the fill level of the reservoir 8 in dependence on the temperature is determined (see step 102) on the basis of the previously described curves 91 and 93. In step 104, the current fill level, i.e. the actual value of the fill level in the reservoir 8, is determined. In step 106, it is checked whether the current fill-level value in the reservoir 8 is less than a reference value. Optionally, it can be taken into account whether the current fill-level value is in a tolerance range around the reference value. Then, in step 108, the reservoir 8 is filled by means of the pump in the service device 50. Once the reservoir 8 has been filled with a predefined quantity of liquid coolant, the pump is switched of in step 110 and an inlet valve and a return valve in the service device 50 are closed. A wait is then necessary, in step 112, until the fill level of the reservoir 8 has stabilized. For example, there may be a wait of 20 seconds. In step 114, it is checked whether the current fill-level value in the reservoir 8 is in a tolerance band around the reference value. If it is, the correct fill level is set, and the procedure can be terminated. If the current value is not within a tolerance band around the reference value, it is checked in step 116 whether the current value is less than a reference value, it being possible for a reference band to be taken into account in the case of the reference value. If it is not, it is checked in the next step, step 118, whether the current value is greater than a reference value. If it is, the procedure is continued at step 122.

If it was determined in step 106 that the current fill-level value is less than a reference value inclusive of a tolerance band, it is additionally checked, in step 120, whether the current fill-level value is greater than the reference value, or than a reference band around the reference value. If it is not, the procedure can be terminated. In step 122, the reservoir 8 is emptied, in that the inlet valve in the service device 50 is closed and the return valve in the service device 50 is opened. In step 124, the return valve in the service device 50 is closed when a sufficient quantity of cooling liquid has been removed from the reservoir 8. A wait, for example of 20 seconds, is then again necessary until the fill-level of the reservoir 8 has stabilized (step 126). In step 128 it is checked whether the current fill-level value is within a reference band around the reference value. If it is, the procedure can be terminated. Otherwise, the procedure continues with the previously described step 116.

The service device 50 can then output a report, with information on the state of the liquid cooling system 1 and/or of the service device 50 before and after filling.

A service procedure for emptying the entire liquid cooling system 1 is explained in the following. It is possible for the entire liquid cooling system 1 to be emptied both when the electric power supply is switched on and when it is switched off. For this purpose, the service device 50 is connected to the liquid cooling system 1 in the manner described previously in respect of filling of the entire liquid cooling system 1, i.e. service lines 52, 54, 56, 58, 62 and the electrical communication line 60 are connected to their respective connector 24, 26, 28, 30, 34 and 32. If the control device 10 is being supplied with electric power, it enters the service state, in particular the inactive service state. If the electric power supply to the control device 10 is in the switched-on state during the emptying operation, it is ensured that it enters the service state, in particular the inactive service state. Before being connected, the service lines 54, 56, 58 and 62 are emptied by the service device 50. Optionally, the service lines 54, 56, 58 and 62 can be filled with nitrogen before being connected to the liquid cooling system 1. After the service lines 52, 54, 56, 58, 62 have been connected, the non-return valve 14 is closed manually or automatically. Nitrogen is then passed, via the reservoir service line 52, into the pressure chamber 94 of the reservoir 8, as a result of which the coolant present in the coolant chamber 92 of the reservoir is forced into the service device 50, via the output service line 56.

All coolant control valves 86 assigned to consumers 6 are then opened, for example within 30 seconds. The entire liquid cooling system 1 is then emptied, in that nitrogen is forced into the cooling circuit via the intake service line 58, which nitrogen causes coolant to emerge from the liquid cooling system 1, via the output service line 56, and to enter the service device 50. In the next step, a valve in the service device 50, through which valve there flows the fluid flowing out of the output service line 56, is opened and closed cyclically. Additional pressure can thereby be built up in the liquid cooling system 1, as a result of which better emptying of the liquid cooling system 1 is rendered possible.

Nitrogen then continues to be passed into the cooling system 1 via the intake service line 58, which nitrogen, together with the coolant to be emptied, emerges from the cooling system 1 through the output service line 56. Individual coolant control valves 86 assigned to consumers 6 are closed in this case. It is possible in this case for all coolant control valves 86 to be closed and only one of the coolant control valves to be open. As a result, the coolant is removed particularly thoroughly from the consumer 6 assigned to the open coolant control valve 86. Another coolant control valve 86 is then opened, all remaining coolant control valves 86 being closed. However, it is also possible for a plurality of coolant control valves 86 to be open, while the majority of coolant control valves 86 are closed.

The sub-system 12, which comprises the refrigeration source 2, is then emptied via the intake service line 58 and the refrigeration-source output service line 62, in that nitrogen is forced into the intake service line 58. The emptying of the sub-system is described in greater detail in the following. A residual quantity of coolant in the reservoir 8 is then removed, in that nitrogen is passed into the liquid cooling system 1 via the output service line 58, the nitrogen and the liquid coolant to be emptied emerging from the liquid cooling system 1 through the reservoir deaeration service line 54. The non-return valve 14 is then opened. A residual quantity of liquid coolant, for example that liquid coolant that has collected in the non-return valve 14, can now be removed, in that nitrogen is forced into the liquid cooling system 1 via the intake service line 58, and the nitrogen, and the liquid coolant to be removed, are taken out of the liquid cooling system 1 via the intake service line 56. Emptying of the sub-system may be necessary if there is a need to replace a sub-system component that can only be replaced when the sub-system is in the emptied state.

This procedure can be assisted by closing the second non-return valve 36. Nitrogen is then supplied to the reservoir 8 via the reservoir service line 52, in order to position the diaphragm 96 of the reservoir 8 according to the emptied state of the reservoir 8. The service device 50 can then output a report, with information on the state of the liquid cooling system 1 and/or of the service device 50 before and after emptying. Further, it is possible for the service device 50 to clean the liquid coolant, in order to store it in internal tanks and, if necessary, refill the liquid cooling system 1. At the end of the service, all lines leading from the service device 50 to the service panel are removed from the latter.

As mentioned previously, the liquid cooling system 1 can also be emptied when it is not being supplied with electric power. The steps to be performed for this correspond substantially to the emptying of the entire liquid cooling system 1 with electric power being supplied, only the step of cyclic opening and closing of the coolant control valves 86 of the consumers 6 being omitted, since these valves cannot be actuated without being supplied with electric power. Since, typically, the coolant control valves 86 open when the electric power supply is interrupted, at least a certain emptying of the liquid cooling system 1 is possible.

The emptying of the sub-system 12 or of the entire liquid cooling system 1 can be checked by the user through an inspection glass on the service device 50. If the inspection glass shows coolant, a step or a plurality of steps for emptying the sub-system 12, or emptying the entire liquid cooling system 1, can be repeated.

A service procedure for deaerating the entire liquid cooling system 1 is explained in the following. For this, the service device 50 must be realized as a total service device. Deaeration of the liquid cooling system 1 is necessary if, for example, a component that has not been pre-filled has been integrated into the liquid cooling system 1. If the component is not filled with liquid coolant before being integrated, air, which can damage the other components of the liquid cooling system 1, for example the pump, is brought into the cooling circuit.

During deaeration, the entire liquid cooling system 1, and particularly the consumers 6, must be supplied with electric power. By means of a pump (not shown) in the service device 50, coolant is passed through the liquid cooling system 1 for the purpose of deaeration. In this case, the liquid coolant is cleaned and filtered. Following the deaeration process, the liquid cooling system 1 can be refilled, this corresponding to the previously described filling operation. As described previously, during deaeration and filling the temperature of the liquid coolant is measured and, if necessary, cooled by a cooling device (not shown) in the service device 50. Following the deaeration and a possible refilling of the liquid cooling system 1, the fill level in the reservoir 8 can be set, as described previously.

The reservoir deaeration service line 54, the output service line 56, the intake service line 58 and the refrigeration-source output line 62 are filled with liquid coolant, and deaerated. These services lines 54, 56, 58, 62, as well as the reservoir service line 52, which likewise has been deaerated by the in-filling of nitrogen, and the electrical communication line 60 are each connected to the corresponding connector of the liquid cooling system. The control device 10 enters the service state, and in particular the inactive service state. The non-return valve 14 is then closed manually or automatically. After the non-return valve 14 has been closed, the control device 10 enters the refilling service state, which corresponds substantially to the filling service state. Within about 30 seconds all coolant control valves 86 of the consumers 6 are opened.

An initial pressure is built up in the reservoir 8, in that nitrogen is passed into the pressure chamber 94 of the reservoir via the reservoir service line 52, as a result of which pressure is applied to the entire cooling circuit. For the actual deaeration, liquid coolant is supplied to the cooling system 1 from the service device 50, via the intake service line 58, and is carried away via the output service line 56, the coolant being supplied at differing volumetric flow rates and differing pressures. At the same time, the cooling circuit is deaerated. For this purpose, a valve can be provided at one or more locations of the cooling circuit, which valve can be opened to enable air to come out of the cooling circuit. A valve can also be provided at the service device 50, which valve can be opened for the purpose of deaerating the cooling circuit of the liquid cooling system 1 and/or deaerating the service device 50. It is understood that the coolant can be cleaned and/or dehydrated while being circulated through the service device 50. The coolant in the coolant chamber 92 of the reservoir 8 is then deaerated, in that coolant is supplied via the intake service line 58, and air, or coolant with air, is removed from the reservoir deaeration service line 54. The first non-return valve 14 is then opened. The fill level of the reservoir 8 can now be checked and set, as described previously. The service device 50 now outputs a report on the procedure performed, with information on the state of the liquid cooling system 1 before and after the deaeration operation. The service lines 52, 54, 56, 58, 62 and the electrical communication line 60 can then be removed from the liquid cooling system 1.

The above-mentioned servicing operations can be performed, preferably, with a total service device. The servicing operations described in the following can be performed with a partial service device, which can be of a simpler construction. In particular, provision is made whereby the following servicing operations can be performed between two flights, for example while the aircraft is at the gate. It is understood that the following servicing operations can also be performed by a total service device.

A servicing operation for replenishing the reservoir 8 is explained in the following, with reference to FIG. 4. The output service line 56 is deaerated by the service device 50, in that it is filled with liquid coolant. It is then connected to the cooling-circuit output connector 28, the electrical communication line 60 is connected to the communication connector 32, and the reservoir service line 52 is connected to the reservoir supply connector 24. The reservoir service line 52 can also be deaerated, before being connected, by being filled with nitrogen. The service device 50 then sets the fill level of the reservoir 8, as described previously.

When setting of the reservoir fill level has been completed, a report on the performed servicing operation is output, with information on the state of the cooling system 1 and/or of the service device 50, and the service lines 52, 56 and the electrical communication line 60 are disconnected from their corresponding connectors 24, 28. In the case of this servicing operation, the liquid cooling system 1 must be supplied with electric power, in order that the reservoir fill-level sensor 99 can sense the fill level of the reservoir 8.

The filling of a sub-system 12 of the liquid cooling system 1 is explained with reference to FIG. 5. This servicing operation is required when system components, for example the refrigeration source 2, the pump, a sensor, a safety valve and the like, which are not provided with self-closing quick-couplings, are replaced. In the case of this servicing operation, a sub-region of the liquid cooling system 1 is filled, and the fill level of the reservoir 8 is then checked and set. During this operation, the liquid cooling system 1 is supplied with electric power. The output service line 56, the intake service line 58 and the refrigeration-source output service line 62 are filled with liquid coolant, for the purpose of deaeration. The reservoir service line 52 is filled with nitrogen for the purpose of deaeration. These service lines 52, 56, 58, 62, together with the electrical communication line 60, are then connected to the respective connectors of the liquid cooling system 1. The first non-return valve 14 and the second non-return valve 32 must be in the closed state, because the sub-system 12 was previously emptied. It is therefore necessary to check whether the first non-return valve 14 and the second non-return valve 32 are closed. If not, the first non-return valve 14 and the second non-return valve 36 are closed automatically or manually.

The control device 10 enters the service state, in particular the inactive service state. The sub-system 12 is then filled with liquid coolant, in that liquid coolant is supplied via the intake service line 58, and air, or coolant, is carried away from the sub-system 12 via the refrigeration-source output service line 62. Differing volumetric flow rates and/or pressures are used during the filling and subsequent circulation of the coolant, in order to deaerate the sub-system 12 as well as possible. As mentioned previously, a valve that can be opened during the deaeration operation can be provided in the sub-system 12 and/or in the service device 50, to enable air to come out of the cooling circuit. Following the deaeration operation, the first non-return valve 14 and the second non-return valve 36 are opened. The service device 50 can be deaerated, as described previously, before and/or after the non-return valves 14, 36 have been opened. The fill level of the reservoir 8 is now set, as described previously.

A report on the performed servicing operation can be output, with information on the state of the liquid cooling system 1, the sub-system 12 and/or the service device 50 before and after the servicing operation. Finally, the service lines 52, 56, 58, 62 and the electrical communication line 60 are removed from the liquid cooling system 1.

A servicing operation for emptying a sub-system 12 of the liquid cooling system 1 is described in the following with reference to FIG. 6. This servicing operation is performed if it is necessary to replace a system component that is not equipped with self-closing quick-couplings. The electric power supply to the liquid cooling system 1 may be in the switched-on or switched-off state during this servicing operation.

The intake service line 58 and the refrigeration-source output service line 62 are emptied by removing any liquid coolant that may be present and, optionally, nitrogen is passed into the intake service line 58 and the refrigeration-source output service line 62 before they are connected to the respective connectors on the liquid cooling system 1. The first non-return valve 14 and the second non-return valve 36 are closed. If the liquid cooling system 1 is supplied with electric power, the control device 10 enters the service state, in particular the inactive service state. If the control device is not supplied with electric power, it must be ensured that, upon the electric power supply being switched on during the servicing operation, the control device 10 goes into the service state, as described previously. The sub-system 12 is emptied, in that nitrogen is supplied via the intake service line 58 and coolant and/or nitrogen is carried away to the service device 50 via the refrigeration-source output service line 62. A valve, through which the fluid from the refrigeration-source output service line 62 flows, is then opened and closed cyclically in the service device 50, to better empty the sub-system 12 through an increased build-up of pressure.

The emptying of the sub-system 12, or of the entire liquid cooling system 1, can be checked by the user, through an inspection glass on the service device 50 and/or of the liquid cooling system 1. If the inspection glass shows coolant, one or more steps for emptying the sub-system 12 can be repeated.

Finally, a report on the performed servicing operation can be output, with information on the state of the liquid cooling system 1, the sub-system 12 and the service device 50 before and after the servicing operation. The electrical communication line 60 and the service lines 58 and 62 can be removed from the liquid cooling system 1.

A servicing operation for a leakage test of the sub-system 12 is described with reference to FIG. 7. In the case of this servicing operation, the liquid cooling system 1 need not be supplied with electric power. The sub-region 12 of the liquid cooling system is pressurized with nitrogen, and the critical locations, for example connections, can be checked by the user for the presence of a leakage, by means of a leakage detection fluid, for example soap water or leakage spray. The sub-system 12 can be emptied before the leakage test.

The intake service line 58 and the refrigeration-source output service line 62 are emptied by the service device 50, such that there is no liquid coolant therein. Optionally, these service lines 58, 62 can be filled up with nitrogen. The first non-return valve 14 and the second non-return valve 36 are closed manually or automatically. The intake service line 58 and the refrigeration-source output service line 62 are connected to the corresponding connectors 30, 34 of the liquid cooling system 1. Further, the electrical communication line 60 is connected to the communication connector 32, whereby it can be ensured that the control device 10 enters the service state, in particular the inactive service state, if the liquid cooling system 1 is being supplied with electric power during the servicing operation or if the electric power supply is switched on during the servicing operation. Nitrogen is passed into the sub-system 12 via the intake service line 58, and the sub-system 12 is kept pressurized until the leakage testing of the sub-system 12 is completed. Once completion of the leakage test has been confirmed by the user, via the operator control system of the service device 50, the pressure in the sub-system 12 is removed via the intake service line 58 and the refrigeration-source output line 62. This servicing operation can be performed with the power supply to the liquid cooling system 1 or to the control device 10 either switched-on or switched-off.

A report on the leakage testing of the sub-system 12 can be output, with information on the state of the liquid cooling system 1, the sub-system 12 and/or the service device 50 before and after the release of the pressure. The service lines 58, 62 and the electrical communication line 60 can then be disconnected from the liquid cooling system 1.

A leakage test of the entire liquid cooling system 1 is now described with reference to FIG. 8. In the case of this servicing operation, the control device 10 need not be supplied with electric power. The entire liquid cooling system 1 is pressurized with nitrogen, and critical locations, for example connections, are checked by a user by means of a leakage detection fluid, for example soap water or leakage spray, as described previously, in order to determine the presence of a leakage. The liquid cooling system 1 can be emptied before the leakage test.

For the leakage test, the intake service line 58 and the output service line 56 are emptied by the service device 50, such that there is no liquid coolant therein. Optionally, the intake service line 58 and the cooling-circuit output line 56 can be filled with nitrogen. The intake service line 58 and the output service line 56 are then connected to the corresponding connectors 30, 28 of the liquid cooling system 1. Further, the electrical communication line 60 is connected to the liquid cooling system 1, in order to ensure that the control device 10 enters the service state, in particular the inactive service state, if the control device 10 should be supplied with electric power, or if its electric power supply is switched on, during the leakage test. Further, the reservoir service line 52 is connected to the corresponding connector 24 of the liquid cooling system 1. The liquid cooling system 1 is pressurized with nitrogen via the intake service line 58 and the reservoir service line 52. This pressure is maintained until the user has completed the leakage test and has confirmed this via the operator control system of the service device 50. The pressure in the liquid cooling system 1 is then relieved via the intake service line 58, the output service line 56 and the reservoir service line 52. The service lines 52, 50, 56, 58 and the electrical communication line 60 can be removed from the liquid cooling system. A report on the leakage test can be output, with information on the state of the liquid cooling system 1 and/or the service device 50 before and after the release of the pressure.

A servicing operation for replacing a reservoir fill-level sensor 99 (see FIG. 11) of the reservoir 8 is now described with reference to FIG. 9. In the case of this servicing operation, the reservoir fill-level sensor 99 can be replaced without the need to empty the liquid cooling system 1. For this purpose, the nitrogen is let out of the pressure chamber 94 of the reservoir 8, as a result of which the diaphragm 96 moves in the direction of the stop at maximum fill level. This can be effected through gravity, since the reservoir 8 is connected to the lowest point of the cooling circuit. The weight of the liquid coolant thus forces the diaphragm 96 of the reservoir 8 into the stop position for a maximum fill level. During this servicing operation, the electric power supply for the control device 10 can be in either the switched-on or the switched-off state.

The electrical communication line 60 and the reservoir service line 52 are connected to their respective connectors of the liquid cooling system 1. If the electric power supply to the control device 10 has been switched on, the device enters the service state, in particular the inactive service state. If the electric power supply to the control device 10 is switched on during the servicing operation, it is ensured, as described previously, that the control device 10 enters the service state, in particular the inactive service state. The pressure in the pressure chamber 94 of the reservoir 8 is relieved over a defined period, via the reservoir service line 52. A report on the relieving of the pressure in the pressure chamber 94 of the reservoir 8 can be output, with information on the state of the liquid cooling system 1, the reservoir 8 and/or the service device 50 before and after the relieving of the pressure. Optionally, the service line 52 can be removed.

The reservoir fill-level sensor 99 and/or a pressure sensor is/are then serviced, which can comprise, for example, testing, repairing and/or replacing the reservoir fill-level sensor 99 and/or the pressure sensor.

The pressure in the pressure chamber 94 of the reservoir 8 must then be built up again. For this purpose, the electrical communication line 60 and the reservoir service line 52 are again connected to the liquid cooling system 1, if they have previously been removed. It is understood that, before the reservoir service line 52 is connected, it can be deaerated through the supply of nitrogen from the service device 50. If the electric power supply to the control device 10 has been switched on, it enters the service state, in particular the inactive service state. As described previously, it is ensured that the control device 10 enters the service state, in particular the inactive service state, if the electric power supply to the control device 10 is switched on during the servicing operation.

Nitrogen is then passed into the pressure chamber 94 of the reservoir 8, via the reservoir service line 52, in order again to build up the pressure in the pressure chamber 94. The previously described fill curve, shown in FIG. 2, can be used for this purpose. A pressure held in the pressure chamber 94 must be held constant over a predefined period, in order that the reservoir fill level can be brought back to the initial position and in order for the pressure values in the system to stabilize. Following expiry of this period, the pressure in the pressure chamber 94 can be changed again, in order for the optimum filling pressure to be achieved successively. Following each change in pressure, a wait, of the predefined time period, is again necessary, until the pressure value can again be adapted following stabilization of the system. The position of the diaphragm 96 can be determined, by means of an appropriate sensor, during the setting of the pressure in the pressure chamber 94 of the reservoir 8. The filling of the pressure chamber 94 with nitrogen, having regard to the diaphragm position, can be controlled by the control device 10 or the service device 50. In the latter case, it must be ensured that the diaphragm position, i.e. the fill level of the reservoir, is sent to the service device 50.

After the pressure chamber 94 of the reservoir 8 has been filled, a report on the performed servicing operation is output, with information on the state of the liquid cooling system 1, the reservoir 8 and/or the service device 50 before and after the servicing operation. The electrical communication line 60 and the reservoir supply service line 52 can be disconnected from the liquid cooling system 1.

The servicing of a single component 6 of a liquid cooling system 1 of an aircraft is explained with reference to FIG. 10. FIG. 10 shows, exemplarily, a consumer 6, comprising a cooling-liquid/air heat exchanger 88, a coolant control valve 86, a consumer inlet 80, a consumer outlet 82 and a consumer control connector 84. Liquid coolant flows through the consumer inlet 80 into the consumer 6, and through the coolant control valve 86 and the cooling-liquid/air heat exchanger 88. The coolant emerges from the consumer through the consumer outlet 82. The coolant control valve 86 is controlled by means of signal received through the consumer control connector 84. It is thereby possible to set the amount of coolant flowing through the liquid-coolant/air heat exchanger 88. The consumer 6 can be a chilling cabinet for a galley trolley, an aircraft entertainment system, a cooling device for a flight computer, a separately climate-controlled region of a cabin, or the like. If the consumer 6 is removed from the liquid cooling system 1, it will typically contain liquid coolant. It is understood that this coolant must be removed from the consumer 6 prior to any testing or repair of the latter. Further, the consumer 6 must be filled with coolant before it is integrated into the liquid cooling system 1, so that no air, or as little air as possible, is brought into the cooling circuit of the liquid cooling system 1.

A service device 50, which can be identical to the previously described total service device or partial service device, comprises at least a coolant reservoir, a pump, a filter, a control computer and an operator control system. These elements can be identical to the previously described components of a service device. Further, the service device 50 comprises a consumer supply service line 64, a consumer discharge service line 66 and a consumer control line 68.

When the consumer supply service line 64 has been connected to the consumer inlet 80, the consumer discharge service line 66 has been connected to the consumer outlet 82, and the consumer service control line 68 has been connected to the consumer control connector 84, the service device 50 can fill the consumer 6 with coolant and can empty the consumer. The consumer inlet 80 and the consumer outlet 82 are realized as self-closing quick-couplings. It can thereby be ensured that, after the consumer 6 has been filled, no coolant emerges from the consumer 6 and no air enters the consumer 6, which coolant and air could enter the cooling circuit of the cooling system 1 following the integration of the consumer 6. The filling and emptying of the consumer 6 can be effected outside of the aircraft.

For the purpose of filling the consumer 6, the consumer supply service line 64 and the consumer discharge service line 66 are connected to the respective connector 80, 82 of the consumer 6. Further, the consumer service control line 68 is connected to the consumer 6, the consumer service control line 68 being able to transmit an electrical signal or a pneumatic signal. The service device 50 issues an instruction for the coolant control valve 86 to be opened. In the service device 50, the pump is switched on, in order for liquid coolant to be passed into the consumer 6 via the consumer supply service line 64. Liquid coolant is supplied to the consumer 6 until the liquid coolant returned by the consumer discharge service line 66 no longer contains any air bubbles, this being identifiable through an inspection glass on the service device 50. The pump in the service device 50 is then switched off, and the consumer service lines 64, 66 and the consumer service control line 68 are disconnected from the consumer 6. If the coolant control valve 86 is so realized that it is open when in the de-energized state, it is not necessary for the consumer service control line 68 to be connected to the consumer 6.

For the purpose of emptying the consumer 6, the consumer supply service line 64, the consumer discharge service line 66 and, if necessary, the consumer service control line 68 are connected, as described previously, to the consumer 6. If necessary, the service device 50 instructs the coolant control valve 86 to allow coolant to flow through the consumer 6. Nitrogen is then passed into the consumer 6 via the consumer supply service line 64, as a result of which the coolant and the nitrogen emerge from the consumer 6 via the consumer discharge service line 66. A valve (not shown) in the service device 50 is then opened and closed cyclically, which valve controls a flow of fluid through the consumer discharge service line 66. The coolant can thereby be removed from the consumer 6 in a particularly effective manner. It is possible to check, via an inspection glass on the service device 50, whether liquid coolant is still being carried away via the consumer discharge service line 66. If liquid coolant is no longer being carried away from the consumer 6, the supply of nitrogen to the consumer 6 can be interrupted. The pressure is then relieved via the consumer supply service line 64 and/or via the consumer discharge service line 66. Finally, the consumer supply service line 64, the consumer discharge service line 66 and, if necessary, the consumer service control line 68 are disconnected from the consumer 6.

As mentioned previously, it is not necessary to connect the consumer service control line 68 if the valve 86 is automatically in an open state when not being supplied with electric power.

Any component, for example a pump, a refrigerating machine or the like of a liquid cooling system 1 can be serviced, instead of the consumer 6.

It is understood that, for each of the previously described servicing operations, a report can be output at the end of the operation, which report indicates the state of the consumer 6, the reservoir 8, the sub-system 12, the refrigeration source 2, the control device 10 and/or the service device 50 before and after the respective servicing operation. The service device 50 can be operated in a largely automated manner. The service device can have an operator control system, on which there runs a program having a user interface.

Via the user interface, a user can select the required servicing operation. The control program informs the user which service lines and communication lines are to be connected to the liquid cooling system 1. Further, the program can prompt the user to supply electric power to the liquid cooling system 1 and, in particular, to the control device 10. Further, the user is prompted, via the program, to actuate the first non-return valve 14 and the second non-return valve 36 if these valves cannot be actuated automatically. Further, the program can be set up in such a way that the user must confirm each step after having executed such a step following prompting by the program. By means of the program, and being automated insofar as possible, the service device 50 can supply liquid coolant, remove liquid coolant, supply nitrogen and remove nitrogen via the service lines, as described previously in detail.

Further, the service device 50 can have a water separator, in order that water can be removed from the liquid coolant, i.e. so that the liquid coolant is dehydrated.

The pressure chamber 94 of the reservoir 8 can be closed, such that there is no need for the reservoir supply service line. In the case of this realization, there is no need to set the pressure, it being necessary only to set the liquid fill level.

The present invention has the advantage that the process of servicing a liquid cooling system 1 and a component 2, 6, 12 thereof is as automated as possible. As a result, on the one hand, the servicing is performed more rapidly and, on the other hand, the safety of an aircraft is increased, since the occurrence of an error is less likely, owing to the automation.

It is not necessary for a component 2 or a sub-system 12 to be removed from the liquid cooling system 1 for the purpose of servicing. Consequently, servicing can be simplified.

The service method described herein has the further advantage that it can also be adapted to future liquid cooling systems 1, through adaptation of the program. Usually, this requires only the alteration of values of individual parameters. Further, the amount of user training is reduced, since the user is guided through the individual servicing operations via the operator control system of the service device 50. Further, the user cannot deviate from the predefined procedure, and consequently the occurrence of an error becomes less likely.

The invention claimed is:

1. Method for servicing at least a part of a liquid cooling system (1) of an aircraft or a component (6, 12) of the liquid cooling system (1), comprising:

setting up an information transfer between a liquid cooling service device (50) and a liquid cooling control device (10) or a component (6) of the liquid cooling system (1) that is to be serviced, in order to exchange at least one instruction between the liquid cooling service device (50) and the liquid cooling control device (10) or the component (6) to be serviced; and sending a first instruction from the liquid cooling service device (50) to the liquid cooling control device (10) or to the component (6) to be serviced, through which instruction the liquid cooling control device (10) or the component (6) are switched to a service state;
the method further comprising at least one of the following steps:
  connecting, by means of a reservoir service line (52), the liquid cooling service device (50) to a coolant reservoir (8) of the liquid cooling system (1), in which liquid coolant is separated by a diaphragm (96) from a compressible fluid, in order to supply compressible fluid to the coolant reservoir (8) or in order to discharge compressible fluid from the coolant reservoir (8);
  connecting the liquid cooling service device (50) to a cooling circuit or to the component (6) of the liquid cooling system (1) that is to be serviced, by means of at least one cooling-circuit service line (54, 56, 58, 62, 64, 66), in order to supply coolant to the cooling circuit or to the component (6) of the liquid cooling system (1) that is to be serviced, or in order to discharge coolant from the cooling circuit or from the component (6) of the liquid cooling system (1) that is to be serviced.

2. Service method according to claim 1, comprising the steps:
  connecting the liquid cooling service device (50) to the cooling circuit of the liquid cooling system (1) at a first location of the cooling circuit by means of a first cooling-circuit service line (58);
  connecting the liquid cooling service device (50) to the cooling circuit of the liquid cooling system (1) at a second location of the cooling circuit by means of a second cooling-circuit service line (56);
  shutting off the cooling circuit between the first location and the second location;
  supplying a liquid coolant into the cooling circuit via the first cooling-circuit service line (58); and
  discharging a fluid from the cooling circuit via the second cooling-circuit service line (56).

3. Service method according to claim 1, comprising the steps:
  connecting the liquid cooling service device (50) to the cooling circuit of the liquid cooling system (1) at a first location of the cooling circuit by means of a first cooling-circuit service line (58);
  connecting the liquid cooling service device (50) to the cooling circuit of the liquid cooling system (1) at a second location of the cooling circuit by means of a second cooling-circuit service line (56);
  shutting off the cooling circuit between the first location and the second location;
  supplying a gas into the cooling circuit via the first cooling-circuit service line (58); and
  discharging a liquid coolant from the cooling circuit via the second cooling-circuit service line (56).

4. Method according to either of claims 2 or 3, comprising the step:
  opening a valve (86) assigned to a refrigeration consumer (6) of the liquid cooling system (1), with the effect that liquid coolant is supplyable to the refrigeration consumer (6) and a fluid is dischargeable from the refrigeration consumer (6), or that a gas is supplyable to the refrigeration consumer (6) and liquid coolant is dischargeable from the refrigeration consumer (6).

5. Service method according to claim 1, comprising the steps:
  connecting the liquid cooling service device (50) to the cooling circuit of the liquid cooling system (1) at a first location of the cooling circuit by means of a first cooling-circuit service line (58);
  connecting the liquid cooling service device (50) to the cooling circuit of the liquid cooling system (1) at a second location of the cooling circuit by means of a second cooling-circuit service line (56);
  shutting off the cooling circuit between the first location and the second location;
  supplying a liquid coolant into the cooling circuit via the first cooling-circuit service line (58); and
  discharging a liquid coolant from the cooling circuit via the second cooling-circuit service line (56).

6. Service method according to claim 1, comprising the steps:
  connecting the liquid cooling service device (50) to the cooling circuit of the liquid cooling system (1) at a second location of the cooling circuit by means of a second cooling-circuit service line (56);
  connecting, by means of a reservoir service line (52), the liquid cooling service device (50) to a coolant reservoir (8) of the liquid cooling system (1), in which liquid coolant is separated by a diaphragm (96) from a compressible fluid;
  shutting off the cooling circuit between the second location and a portion of the cooling circuit leading away from the coolant reservoir (8);
  supplying a compressible fluid into the coolant reservoir (8) via the reservoir service line (52); and
  supplying a liquid coolant via the second cooling-circuit service line (56).

7. Service method according to claim 1, comprising the steps:
  connecting the liquid cooling service device (50) to the cooling circuit of the liquid cooling system (1) at a first location of the cooling circuit by means of a first cooling-circuit service line (58);
  connecting the liquid cooling service device (50) to the cooling circuit of the liquid cooling system (1) at a third location of the cooling circuit by means of a third cooling-circuit service line (62);
  shutting off the cooling circuit between the first location and a portion of the cooling circuit leading away from the component (2) of the liquid cooling system (1) that is to be serviced;
  shutting off the cooling circuit between the third location and a portion of the cooling circuit leading away from the at least one component (2) to be serviced;
  supplying a liquid coolant into the cooling circuit via the first cooling-circuit service line (58); and
  taking up, via the third cooling-circuit service line (62), at the third location of the cooling circuit, a fluid emerging from the coolant circuit.

8. Service method according to claim 1, comprising the steps:
  connecting the liquid cooling service device (50) to the cooling circuit of the liquid cooling system (1) at a first location of the cooling circuit by means of a first cooling-circuit service line (58);
  connecting the liquid cooling service device (50) to the cooling circuit of the liquid cooling system (1) at a third location of the cooling circuit by means of a third cooling-circuit service line (62);
  shutting off the cooling circuit between the first location and a portion of the cooling circuit leading away from the at least one component (2) to be serviced;
  shutting off the cooling circuit between the third location and a portion of the cooling circuit leading away from the at least one component (2) to be serviced;

supplying a gas into the cooling circuit via the first cooling-circuit service line (58); and discharging a liquid coolant from the cooling circuit through the third cooling-circuit service line (62).

9. Service method according to claim 1, comprising the steps:

connecting the liquid cooling service device (50) to the cooling circuit of the liquid cooling system (1) at a first location of the cooling circuit by means of a first cooling-circuit service line (58);

connecting the liquid cooling service device (50) to the cooling circuit of the liquid cooling system (1) at a third location of the cooling circuit by means of a third cooling-circuit service line (62);

shutting off the cooling circuit between the first location and a portion of the cooling circuit leading away from the at least one component (2) to be serviced;

shutting off the cooling circuit between the third location and a portion of the cooling circuit leading away from the at least one component (2) to be serviced;

supplying a fluid into the cooling circuit via the first cooling-circuit service line (58); and discharging the fluid from the cooling circuit via the third cooling-circuit service line (62).

10. Service method according to claim 1, comprising the steps:

connecting the liquid cooling service device (50) to the cooling circuit of the liquid cooling system (1) at a first location of the cooling circuit by means of a first cooling-circuit service line (58);

connecting the liquid cooling service device (50) to the cooling circuit of the liquid cooling system (1) at a second location of the liquid cooling system (1) by means of a second cooling-circuit service line (56);

shutting off the cooling circuit between the first location and the second location;

supplying a fluid into the cooling circuit via the first cooling-circuit service line (58); and discharging the fluid from the cooling circuit via the second cooling-circuit service line (56).

11. Service method according to claim 1, comprising the steps:

connecting, by means of a reservoir service line (52), the liquid cooling service device (50) to a coolant reservoir (8) of the liquid cooling system (1), in which liquid coolant is separated by a diaphragm (96) from a compressible fluid;

discharging a compressible fluid from the coolant reservoir (8) via the reservoir service line (52);

servicing a fill-level-sensor (99) of the coolant reservoir (8); and supplying a compressible fluid into the coolant reservoir (8) via the reservoir service line (52).

12. Service method according to claim 1, comprising the steps:

connecting, by means of a reservoir service line (52), the liquid cooling service device (50) to a coolant reservoir (8) of the liquid cooling system (I), in which liquid coolant is separated by a diaphragm (96) from a compressible fluid;

connecting the liquid cooling service device (50) to the cooling circuit of the liquid cooling system (1) at a second location of the cooling circuit, by means of a second cooling-circuit service line (56), the second location of the cooling circuit being in fluid communication with the liquid coolant in the coolant reservoir (8);

determining an actual pressure of the compressible fluid in the coolant reservoir (8);

determining an actual quantity of the liquid coolant in the coolant reservoir (8);

supplying a compressible fluid into the coolant reservoir (8), via the reservoir service line (52), if the actual pressure of the compressible fluid in the coolant reservoir (8) is less than a setpoint pressure, and discharging a compressible fluid from the coolant reservoir (8), via the reservoir service line (52), if the actual pressure of the compressible fluid in the coolant reservoir (8) is greater than a setpoint pressure; and supplying a liquid coolant into the coolant reservoir (8), via the second cooling-circuit service line (56), if the actual quantity of the liquid coolant in the coolant reservoir (8) is less than a setpoint quantity, and discharging a liquid coolant from the coolant reservoir (8), via the second cooling-circuit service line (56), if the actual quantity of the liquid coolant in the coolant reservoir (8) is greater than a setpoint quantity.

13. Aircraft liquid cooling system (1), comprising:

a component to be serviced (6, 12) or a liquid cooling control device (10), which is connectable to a liquid cooling service device (50) and which is set up to receive at least one first instruction from the liquid cooling service device (50), through which instruction the component (6, 12) or the liquid cooling control device (10) is switched to a service state, the liquid cooling system (1) further having at least one of the following features:

a cooling circuit, through which a liquid coolant can flow and which is connectable to the liquid cooling service device (50) by means of at least one cooling-circuit service line (54, 56, 58, 62, 64, 66), in order to supply coolant to the cooling circuit or to the component (6) of the liquid cooling system (1) that is to be serviced, or in order to discharge coolant from the cooling circuit or from the component (6) of the liquid cooling system (1) that is to be serviced;

a coolant reservoir (8), in which liquid coolant is separated by a diaphragm (96) from a compressible fluid and which can be connected to the liquid cooling service device (50) by means of a reservoir service line (52), in order to supply compressible fluid into the coolant reservoir (8) or in order to discharge compressible fluid from the coolant reservoir (8).

14. Aircraft liquid cooling service device (50), which is connectable to a component (6, 12) to be serviced or to a liquid cooling control device (10) of an aircraft liquid cooling system (1) and which is set up to send at least one first instruction to the component (6, 12) to be serviced or to the liquid cooling control device (10) of the liquid cooling system (1), through which instruction the component (6, 12) or the liquid cooling control device (10) is switched to a service state, and which aircraft liquid cooling service device further is connectable, by means of at least one cooling-circuit service line (54, 56, 58, 62, 64, 66), to a cooling circuit of the liquid cooling system (1) through which liquid coolant can flow, in order to supply coolant to the cooling circuit or to the component (6) of the liquid cooling system (1) that is to be serviced, or in order to discharge coolant from the cooling circuit or from the component (6) of the liquid cooling system (1) that is to be serviced; and/or which aircraft liquid cooling service device is connectable, by means of a reservoir service line (52), to a coolant reservoir (8) of the liquid cooling system (1), in which liquid coolant is separated by a diaphragm (96) from a compressible fluid, in order to supply compressible fluid into the coolant reservoir (8) or in order to discharge compressible fluid from the coolant reservoir (8).

* * * * *